United States Patent
Harkins

(10) Patent No.: US 9,912,601 B2
(45) Date of Patent: Mar. 6, 2018

(54) SYSTEMS AND METHODS FOR ESTABLISHING COMMUNICATION INTERFACES IN AN INFORMATION TECHNOLOGY INFRASTRUCTURE

(71) Applicant: Neighborhood Marketing, Inc., Andover, MA (US)

(72) Inventor: Paul Harkins, Central Valley, NY (US)

(73) Assignee: NEIGHBOR MARKETING, INC., Andover, MA (US)

( * ) Notice: Subject to any disclaimer, the term of this patent is extended or adjusted under 35 U.S.C. 154(b) by 195 days.

(21) Appl. No.: 14/920,501

(22) Filed: Oct. 22, 2015

(65) Prior Publication Data

US 2017/0118131 A1 Apr. 27, 2017

(51) Int. Cl.
*G06F 15/16* (2006.01)
*H04L 12/801* (2013.01)
*H04L 12/24* (2006.01)
*H04L 29/08* (2006.01)

(52) U.S. Cl.
CPC .......... *H04L 47/39* (2013.01); *H04L 41/0893* (2013.01); *H04L 67/101* (2013.01)

(58) Field of Classification Search
CPC ... H04L 47/39; H04L 41/0893; H04L 67/101; G06Q 20/202
USPC ........................................ 709/219, 217, 218
See application file for complete search history.

(56) References Cited

U.S. PATENT DOCUMENTS

| 5,025,372 A * | 6/1991 | Burton ................ G06Q 20/387 705/14.17 |
| 6,658,568 B1 * | 12/2003 | Ginter .................... G06F 21/10 348/E5.006 |
| 7,120,591 B1 | 10/2006 | Solomon et al. |
| 8,051,008 B2 | 11/2011 | Postrel |

(Continued)

FOREIGN PATENT DOCUMENTS

| JP | 2002-251559 | 9/2002 |
| KR | 100748274 | 8/2007 |

OTHER PUBLICATIONS

International Preliminary Report on Patentability and Written Opinion for International Application No. PCT/US2013/027452 dated Sep. 4, 2014.

(Continued)

*Primary Examiner* — Thu Ha Nguyen
(74) *Attorney, Agent, or Firm* — Shabbi S. Khan; Foley & Lardner LLP

(57) ABSTRACT

A system for establishing communication interfaces in an information technology infrastructure includes a database configured on a server and storing identifiers to each of a plurality of information reporting accounts corresponding to subscriber accounts maintained on a first remote server. The system includes a first interface to receive, via a first network, data about usage of each subscriber's account maintained by the first remote server, wherein the first interface is configured to store the data to the database. The server is configured to identify a second remote server to obtain data about credits to apply and responsive to a predetermined event, establish a connection with the second remote server via a second interface. The second interface is configured to receive, via a second network, for one or more of the information reporting accounts, data about rewards credited and maintained by the second remote server.

13 Claims, 18 Drawing Sheets

(56) References Cited

U.S. PATENT DOCUMENTS

| | | | |
|---|---|---|---|
| 8,186,583 B1 | 5/2012 | McGhie et al. | |
| 8,515,874 B2 | 8/2013 | Blair et al. | |
| 9,135,612 B1* | 9/2015 | Proctor, Jr. | G06Q 20/202 |
| 2002/0062253 A1* | 5/2002 | Dosh, Jr. | G06Q 20/04 |
| | | | 705/14.33 |
| 2002/0133400 A1* | 9/2002 | Terry | G06Q 30/02 |
| | | | 705/14.17 |
| 2002/0178074 A1* | 11/2002 | Bloom | G06Q 10/04 |
| | | | 705/26.81 |
| 2003/0225595 A1* | 12/2003 | Helmus | G06Q 10/063 |
| | | | 705/2 |
| 2004/0122730 A1* | 6/2004 | Tucciarone | G06Q 10/107 |
| | | | 705/14.36 |
| 2007/0282677 A1* | 12/2007 | Carpenter | G06Q 20/02 |
| | | | 705/14.3 |
| 2008/0040270 A1* | 2/2008 | Buchheit | G06Q 20/02 |
| | | | 705/41 |
| 2008/0212763 A1 | 9/2008 | Chandranmenon et al. | |
| 2009/0187413 A1* | 7/2009 | Abels | G06Q 10/10 |
| | | | 705/1.1 |
| 2010/0057551 A1 | 3/2010 | Blaisdell | |
| 2010/0082447 A1 | 4/2010 | Lin et al. | |
| 2010/0100461 A1* | 4/2010 | Laing | G06Q 20/02 |
| | | | 705/30 |
| 2010/0169188 A1 | 7/2010 | Buchheit et al. | |
| 2010/0287068 A1 | 11/2010 | Hu et al. | |
| 2011/0029434 A1 | 2/2011 | Templeton | |
| 2011/0238570 A1 | 9/2011 | Li et al. | |
| 2011/0295722 A1* | 12/2011 | Reisman | G06Q 30/0201 |
| | | | 705/27.1 |
| 2012/0150605 A1* | 6/2012 | Isaacson | G06Q 20/10 |
| | | | 705/14.25 |
| 2012/0323673 A1 | 12/2012 | Bennett et al. | |
| 2013/0006733 A1 | 1/2013 | Fisher | |
| 2013/0030889 A1 | 1/2013 | Davich et al. | |
| 2014/0032297 A1* | 1/2014 | Germann | G06Q 30/0226 |
| | | | 705/14.26 |
| 2014/0278869 A1* | 9/2014 | Wagner | G06Q 30/0215 |
| | | | 705/14.17 |
| 2015/0186918 A1* | 7/2015 | Clarke | G06Q 30/0233 |
| | | | 705/14.23 |
| 2015/0220914 A1* | 8/2015 | Purves | G06Q 20/36 |
| | | | 705/26.8 |
| 2015/0278897 A1* | 10/2015 | Nichols | G06Q 30/0613 |
| | | | 705/26.41 |
| 2016/0012465 A1* | 1/2016 | Sharp | G06Q 20/18 |
| | | | 705/14.17 |
| 2016/0055538 A1* | 2/2016 | Todasco | G06Q 30/0269 |
| | | | 705/14.58 |

OTHER PUBLICATIONS

International Search Report on PCT/US2013/027452 dated Jul. 30, 2013.
U.S. Office Action for U.S. Appl. No. 13/774,824 dated Dec. 3, 2014.
U.S. Office Action for U.S. Appl. No. 13/774,824 dated Jun. 9, 2014.
U.S. Office Action on U.S. Appl. No. 13/774,824 DTD Jul. 22, 2015.
U.S. Office Action on U.S. Appl. No. 13/774,824 dated Dec. 30, 2013.
U.S. Office Action on U.S. Appl. No. 13/774,824 dated Jun. 28, 2013.
Written Opinion on PCT/US2013/027452 dated Jul. 30, 2013.
International Search Report and Written Opinion for International Application No. PCT/US2016/058012 dated Jan. 31, 2017.

* cited by examiner

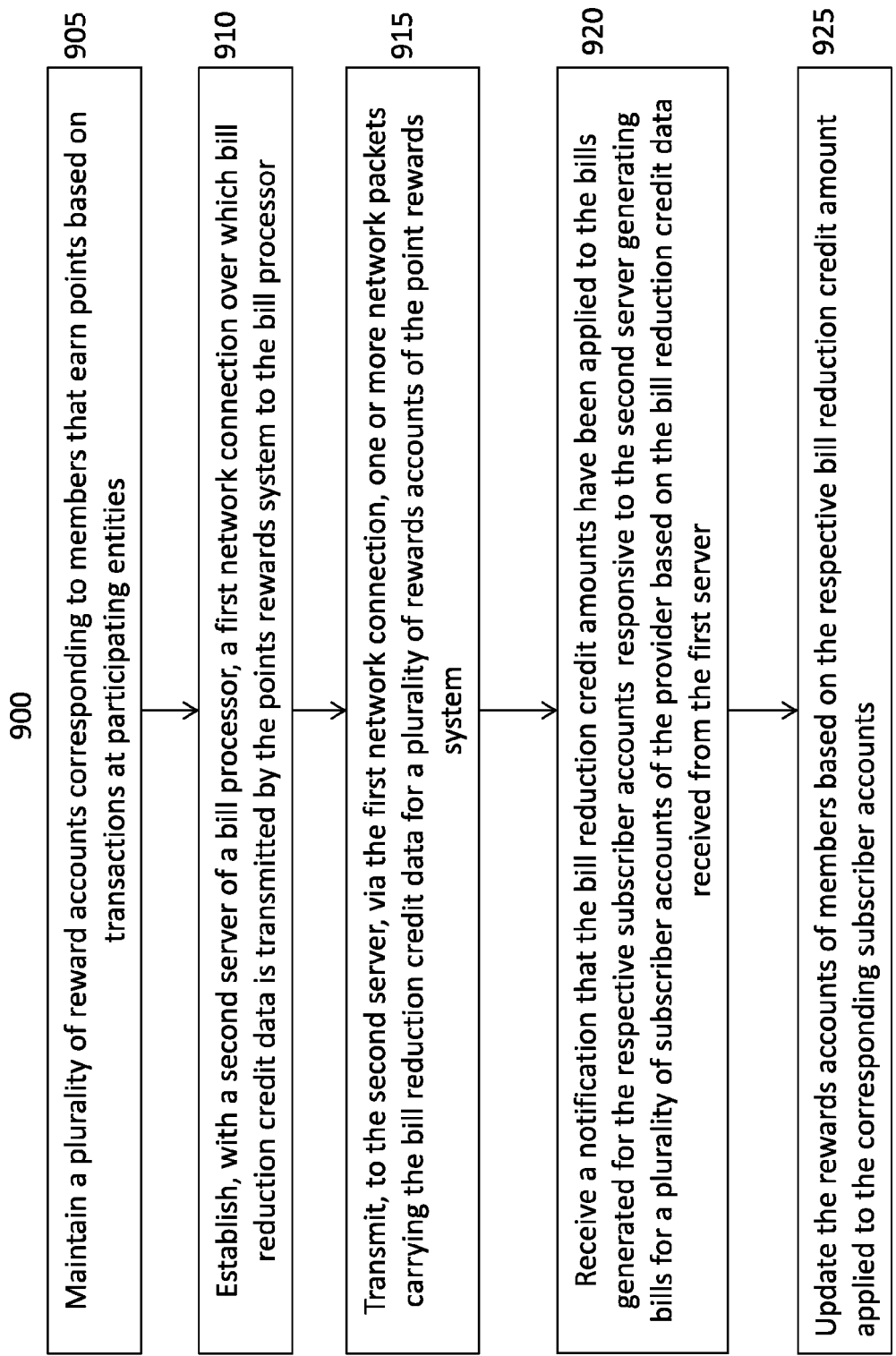

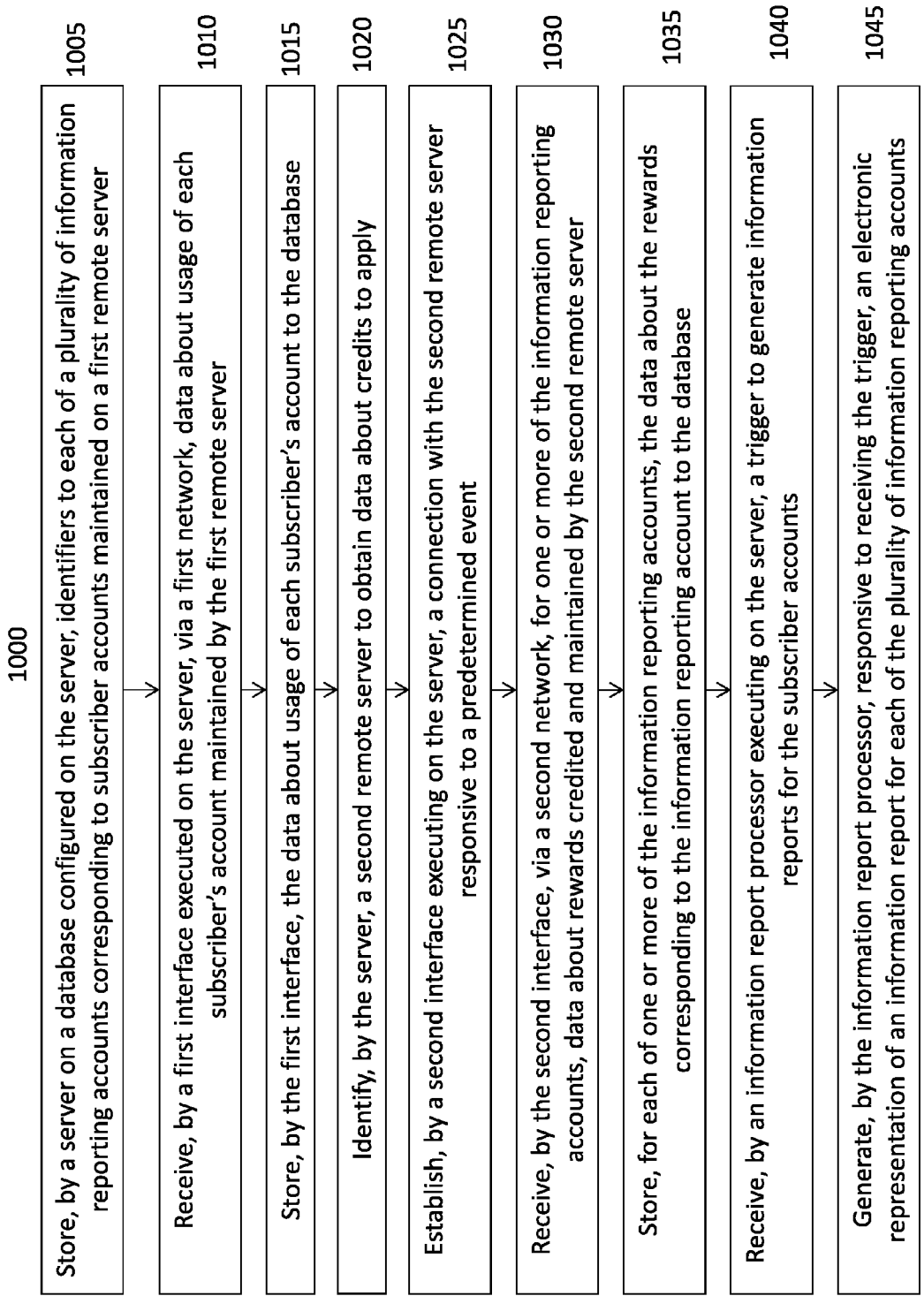

SYSTEMS AND METHODS FOR ESTABLISHING COMMUNICATION INTERFACES IN AN INFORMATION TECHNOLOGY INFRASTRUCTURE

FIELD OF THE INVENTION

The present disclosure relates to systems and methods for improved computer networking environments. In particular, the present disclosure relates to methods and systems for establishing communication interfaces in an information technology infrastructure.

BACKGROUND

Servers of different entities communicate with one another via networks. The servers may establish secure communication channels to receive and transmit data. Servers may further be configured to transmit requests for data via application programming interfaces (APIs). These interfaces may be configured to establish communication channels through which requests can be processed according to one or more protocols.

SUMMARY

A system for establishing communication interfaces in an information technology infrastructure, includes a database configured on a server, the database storing identifiers to each of a plurality of information reporting accounts corresponding to subscriber accounts maintained on a first remote server. The system includes a first interface configured to receive, via a first network, data about usage of each subscriber's account maintained by the first remote server, wherein the first interface is configured to store the data to the database. The server is configured to identify a second remote server to obtain data about credits to apply and responsive to a predetermined event, establish a connection with the second remote server via a second interface. The second interface is configured to receive, via a second network, for one or more of the information reporting accounts, data about rewards credited and maintained by the second remote server, and store, for each of one or more of the information reporting accounts corresponding to the subscriber accounts, the data about the rewards corresponding to the information reporting account to the database. An information report processor configured to receive a trigger to generate information reports for the subscriber accounts and to generate, responsive to receiving the trigger, an electronic representation of an information report for each of the plurality of information reporting accounts, the electronic representation of the information report of an information reporting account including a total amount that is based on a difference between a first amount based on the usage of the subscriber account and a second amount based on the rewards corresponding to the information reporting account.

In some implementations, the information report processor is configured to receive the trigger to generate information reports in accordance with a report generation policy including one or more rules based on time. In some implementations, the second interface is configured to receive one or more network packets carrying data identifying the rewards, the data including a first executable file including a batch header, a file header, a detail record, a file trailer and a batch trailer. In some implementations, the second interface is further configured to establish between the server and the second remote server, a secure communication channel over which the second interface receives the data about rewards for one or more of the information reporting accounts.

In some implementations, the server is configured to determine that a condition for generating information reports has been satisfied and responsive to determining that the condition for generating information reports has been satisfied, the server is further configured to cause the second interface to establish the secure communication channel. In some implementations, the condition for generating information reports is based on a report generation policy.

In some implementations, the first interface is further configured to establish between the server and the first remote server, a secure communication channel over which the first interface receives the data about usage of each subscriber's account maintained by the first remote server. In some implementations, the trigger includes a set of computer-executable instructions received from the first remote server.

According to another aspect, a method for establishing communication interfaces in an information technology infrastructure, comprising storing, by a server on a database configured on the server, identifiers to each of a plurality of information reporting accounts corresponding to subscriber accounts maintained on a first remote server. The method includes receiving, by a first interface executed on the server, via a first network, data about usage of each subscriber's account maintained by the first remote server. The method includes storing, by the first interface, the data about usage of each subscriber's account to the database. The method includes identifying, by the server, a second remote server to obtain data about credits to apply. The method includes establishing, by a second interface executing on the server, a connection with the second remote server responsive to a predetermined event. The method includes receiving, by the second interface, via a second network, for one or more of the information reporting accounts, data about rewards credited and maintained by the second remote server. The method includes storing, for each of one or more of the information reporting accounts corresponding to the subscriber accounts, the data about the rewards corresponding to the information reporting account to the database. The method includes receiving, by an information report processor executing on the server, a trigger to generate information reports for the subscriber accounts. The method includes generating, by the information report processor, responsive to receiving the trigger, an electronic representation of an information report for each of the plurality of information reporting accounts, the electronic representation of the information report of an information reporting account including a total amount that is based on a difference between a first amount based on the usage of the subscriber account and a second amount based on the rewards corresponding to the information reporting account.

In some implementations, receiving, by the information report processor executing on the server, the trigger to generate information reports for the subscriber accounts includes receiving the trigger in accordance with a report generation policy including one or more rules based on time. In some implementations, receiving, by the second interface, via the second network, for one or more of the information reporting accounts, data about rewards includes receiving one or more network packets carrying data identifying the rewards, the data including an executable file including a batch header, a file header, a detail record, a file trailer and a batch trailer. In some implementations, establishing, by the second interface executing on the server, the connection with the second remote server responsive to the predetermined event includes establishing between the server and the second remote server, a secure communication channel over which the second interface receives the data about rewards for one or more of the information reporting accounts.

In some implementations, the predetermined event includes receiving, by the server, from the first remote server, the trigger to generate information reports for the subscriber accounts. In some implementations, the method includes determining that a condition for generating information reports has been satisfied and responsive to determining that the condition for generating information reports has been satisfied, causing the second interface to establish the connection. In some implementations, the condition for generating information reports is based on a report generation policy. In some implementations, the first interface is configured to establish between the server and the first remote server, a secure communication channel over which the first interface receives the data about usage of each subscriber's account maintained by the first remote server. In some implementations, the trigger includes a set of computer-executable instructions received from the first remote server.

An intermediary retailer for purchase of commodities and services, between consumers and wholesale and local providers, enables consumers to earn points and use those points as cash to reduce the price of the commodities and services. Points may reduce the price paid at checkout, regardless of where the customer lives, freeing the customer from being tied to geographic price monopolies. Points may be earned through various activities, including social networking behavior, shopping at affiliated retailers, or other means. The customer's purchase and point earning history can be analyzed to provide exclusive rewards or point earning opportunities, targeted advertising or recommendations, or other analytically-based features. Thus, in summary, the systems and methods discussed herein create an online price-transparent platform where consumers can purchase commodities or recurring services, such as home heating oil, natural gas, propane, electricity, internet service, cable service, lawn service, tax services, in-home cleaning services, dry cleaning services, or any other type and form of commodity or service, paid for or subsidized through the use of points earned through various activities, including social networking, third-party retail purchases, or other functions.

In one aspect, the present disclosure is directed to systems and methods for improved commodity pricing and sales. An intermediary system may contract with a plurality of providers to provide a fungible commodity to consumers at a first predetermined price. The intermediary system may also contract with a plurality of consumers to provide the fungible commodity at a second predetermined price. The intermediary system may determine the second predetermined price responsive to a customer point balance, points earned by the consumer performing one or more actions. In some embodiments, points may be awarded responsive to social networking functions, grassroots advertising, or similar actions. In other embodiments, points may be awarded responsive to the consumer's consumption of the commodity relative to a predetermined consumption rate. For example, in one such embodiment, a consumer may earn points by using less than a predetermined amount of heating oil within a predetermined time frame. This may create a "reverse" bulk discount, whereby a consumer may receive a discount through conservation. Such discounts may be priced to correspond to the reduced delivery costs of the providers, the reduced demand through conservation, or similar relationships. In some embodiments, points may provide for loyalty rewards for disparate local services. For example, consumer purchases via retail partners may be awarded with points applicable to purchase of the fungible commodities.

The fungible commodity may comprise home heating oil, natural gas, propane, electricity, or any other commodity. In some embodiments, commodity-like services may be purchased, such as internet service, cable service, or phone service. In still other embodiments, recurring services may be purchased, such as dry cleaning service, in-home cleaning service, tax service, or any other type and form of service. Thus, one skilled in the art may readily appreciate how the examples discussed herein may be applied to purchase and sales of any good or service.

Furthermore, by serving as a single intermediary for a plurality of consumers and a plurality of commodity providers, the intermediary system may allow for smoothing of market prices across diverse geographic markets. For example, in some embodiments, the intermediary system may provide a single nationwide price or a few regional prices, rather than local prices which may be highly volatile responsive to local supply. This may help to increase market transparency.

In another aspect, the present disclosure is directed to systems and methods for using cash credits earned from consumer activity to pay for a purchase of a service of a service provider. A server acting as an intermediary between a plurality of consumers and one or more service providers identifies a points balance of the consumer for an account of a consumer of the plurality of consumers maintained by the server. The points of the point balance are earned by the consumer by taking actions that are external to and tracked by the server and not related to the one or more service providers. In some implementations, the actions taken by the consumer include actions taken by the consumer through one or more social network accounts of the consumer.

A request is received from the consumer to purchase a service of a service provider of the one or more service providers for which the server acts as the intermediary. In some implementations, the service being purchased can be provided by more than one service provider of the one or more service providers. A cash value converted from points of the points balance is then credited to the account of the consumer a cash value. The cash value is applicable as payment to the one or more service providers for the purchase of one or more services. In response to the request to purchase the service, an indication of the cash value available to the consumer from the points balance for use as payment and a bill for a purchase price of the service is provided. In response to the consumer selecting to pay the bill with at least a portion of the cash value from the points balance, the portion of the cash value is applied to pay the bill for the purchase price of the service. In some implementations, the server provides an updated amount to be paid corresponding to a difference between an amount of the bill and the portion of the cash value applied towards the bill.

In some implementations, the actions taken by the consumer at one or more third party web-sites not related to the one or more service providers is received by the server. The server then assigns points to each of the actions. The points balance of the consumer is then updated to include the assigned points.

In some implementations, the server identifies a number of points in the points balance, multiplies the number of points by a points-to-cash conversion rate to generate the cash value adds the cash value to the account of the consumer and removes the points in the points balance used to generate the cash value.

In some implementations, the server identifies the service providers of the one or more service providers providing the service. The service provider providing the service at a lowest price is selected and a bill corresponding to the selected service provider is provided to the consumer purchasing the service. In some implementations, the server identifies a lowest price at which one of the one or more service providers is willing to provide the service. A purchase price greater than the lowest price by a predetermined amount of the service is then determined.

In some implementations, the one or more service providers includes any of the following: a heating oil provider supplying heating oil, an electric utility provider supplying electricity, a water supplier supplying water, a telephone company providing telecommunications services, an internet service provider providing internet services, a television cable company providing television-related services and a health care provider providing health care services.

According to one aspect, a method of generating a bill for an account of a provider based on bill reduction credits is described. A server of a bill processor maintains a plurality of billing accounts for which to generate bills. The server establishes, with a second server of a rewards points system, a first network connection over which bill reduction credit data is transmitted by the rewards points system to the bill processor. The server receives, from the second server, via the first network connection, one or more network packets carrying the bill reduction credit data for a plurality of rewards accounts of the point rewards system. The server receives, from the provider via a second network connection, network packets carrying charge data, the first server configured to use the charge data to generate charges for each of the plurality of subscriber accounts of the provider. The server identifies, for each billing account of the bill processor, a corresponding subscriber account and charge data corresponding to the subscriber account and a respective bill reduction credit amount of the rewards account corresponding to the subscriber account. The bill processor generates, for each subscriber account of the provider, a bill that identifies charges for the subscriber account, a bill reduction credit amount corresponding to the subscriber account, and an amount payable based on a difference between the charges for the account and the bill reduction credit amount.

In another aspect, a method generating a bill for an account of a provider based on bill reduction credits. A server of a rewards points system maintains a plurality of rewards points accounts corresponding to members that earn points based on transactions at participating entities. The server establishes with a second server of a bill processor, a first network connection over which bill reduction credit data is transmitted by the rewards points system to the bill processor. The server transmits to the second server, via the first network connection, one or more network packets carrying the bill reduction credit data for a plurality of rewards accounts of the point rewards system. The server, in response to the second server generating bills for a plurality of subscriber accounts of the provider based on the bill reduction credit data received from the first server, receives a notification that the bill reduction credit amounts have been applied to the bills generated for the respective subscriber accounts. The first server, in response to the first server receiving the notification, updates the rewards accounts of members based on the respective bill reduction credit amount applied to the corresponding subscriber accounts.

In another aspect, a system of generating a bill for an account of a subscription-based provider based on bill reduction credits includes a bill processor including a first server including a billing account manager configured to maintain a plurality of billing accounts for which to generate bills, each billing account specific to a subscriber account of a provider of goods or services, the bill processor generating bills for a plurality of providers. The first server includes a bill reduction credit processor configured to establish, between the first server and a second server of a rewards points system, a first network connection over which bill reduction credit data is transmitted by the rewards points system to the bill processor. The bill reduction credit processor configured to receive, from the second server, via the first network connection, one or more network packets carrying the bill reduction credit data for a plurality of rewards accounts of the point rewards system, the bill reduction credit data including a plurality of entries. Each entry identifies a respective subscriber account of a plurality of subscriber accounts of the provider corresponding to the rewards account, and a bill reduction credit amount by which to reduce the bill to be generated by the bill processor for the respective subscriber account. The bill generator configured to receive, from the provider via a second network connection, charge data to generate charges for each of the plurality of subscriber accounts of the provider. The bill generator further configured to identify, for each billing account of the bill processor, a corresponding subscriber account and charge data corresponding to the subscriber account and a respective bill reduction credit amount of the rewards account corresponding to the subscriber account. The bill generator further configured to generate, for each subscriber account of the provider, a bill that identifies charges for the subscriber account, a bill reduction credit amount corresponding to the subscriber account, and an amount payable based on a difference between the charges for the account and the bill reduction credit amount.

The details of various embodiments of the invention are set forth in the accompanying drawings and the description below.

BRIEF DESCRIPTION OF THE FIGURES

The foregoing and other objects, aspects, features, and advantages of the disclosure will become more apparent and better understood by referring to the following description taken in conjunction with the accompanying drawings, in which:

FIG. 9 is a flow diagram of an embodiment of a method generating a bill for an account of a provider based on bill reduction credits.

FIG. 10 is a flow diagram illustrating a method for establishing communication interfaces in an information technology infrastructure.

Figure 1A:
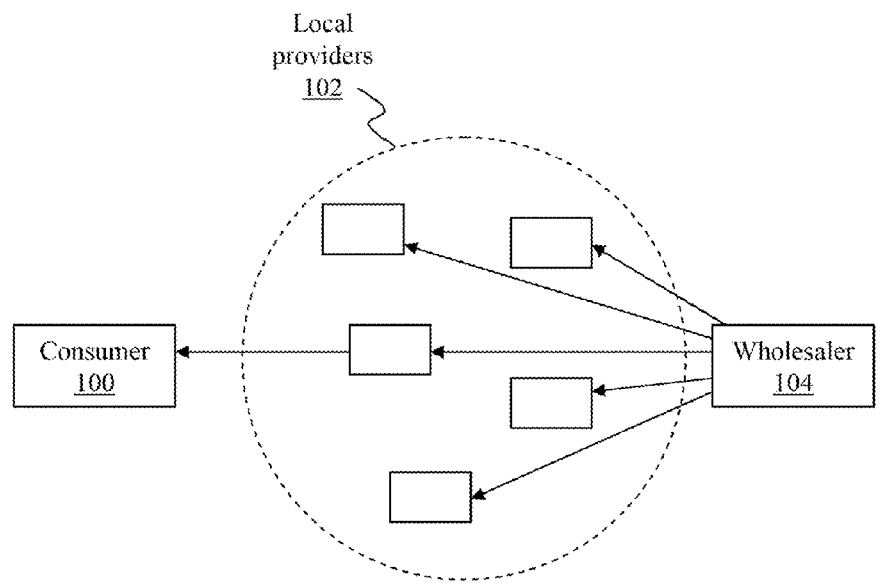
FIG. 1A is a diagrammatic view of a commodity market.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Referring first to FIG. 1A, illustrated is a diagrammatic view of a typical commodity market. One or more consumers 100 may purchase a fungible commodity from one of a plurality of local providers 102, who in turn purchase the commodity from one or more wholesalers 104. The fungible commodity may comprise home heating oil, natural gas, propane, electricity, or any other commodity. In some embodiments, commodity-like services may be purchased, such as internet service, cable service, or phone service. In still other embodiments, recurring services may be purchased, such as dry cleaning service, in-home cleaning service, tax service, or any other type and form of service. Thus, one skilled in the art may readily appreciate how the examples discussed herein may be applied to any good or service. While various local providers 102 may provide different price rates for the commodity, it may be difficult for consumers 100 to compare prices, due to the lack of a unified price database, diverse pricing standards (e.g. short term contracts vs. long term contracts, prices including delivery charges or fees vs. prices on just the commodity, etc.). Additionally, as the commodity may be a necessity with service disruptions resulting in adverse consequences, many consumers will enter into long-term delivery contracts with a single provider 102 at potentially higher rates. Price differences between providers 102 may be due to differences in consumer demand with consumers contracting with each provider 102, differences in amounts of the commodity purchased from the wholesaler or wholesalers 104, differences in margin or overhead at each provider, etc. Accordingly, transparency and comparison is difficult for consumers.

Figure 1B:
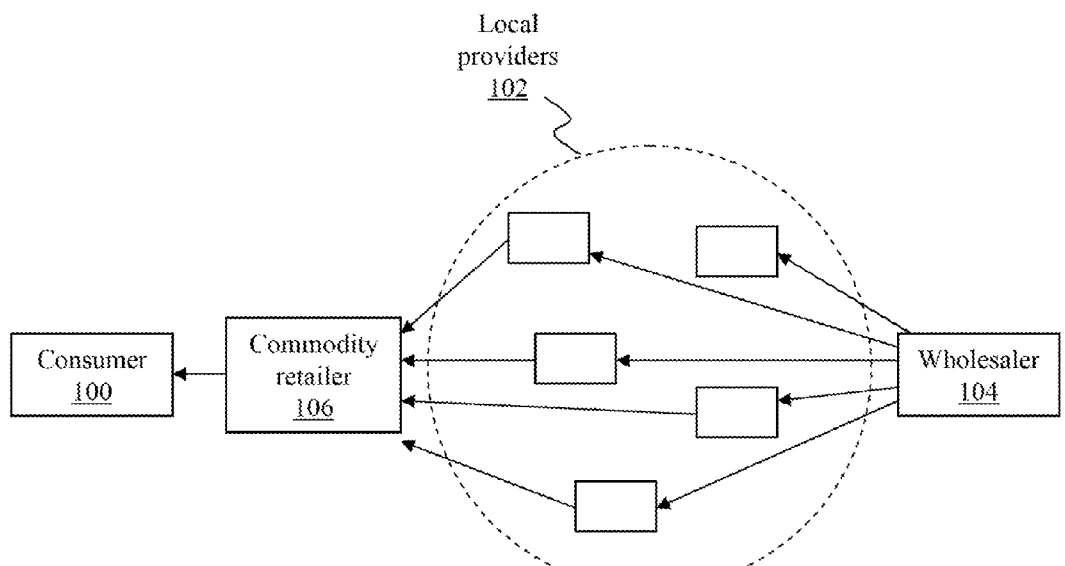
FIG. 1B is a diagrammatic view of a commodity market incorporating an improved commodity retailer.

Referring now to FIG. 1B, illustrated is a diagrammatic view of an improved commodity market incorporating an intermediary pricing system or commodity retailer 106. Commodity retailer 106 may contract with a plurality of local providers 102, and contract with a plurality of consumers 100. The commodity retailer 106 may provide a single price, eliminating differences in pricing between local providers 102. Because the commodity is fungible, to fulfill any particular consumer order, different providers 102 may be selected responsive to individual provider supply (and correspondingly, individual provider price), resulting in the lowest possible price for the consumer contract. In some embodiments, local providers may still deliver the commodity to the consumer, with the commodity retailer 106 providing purchasing and billing systems. This may also reduce expenses for each local provider 102, as well as take advantage of bulk transaction discounts with banks or credit card providers. In some embodiments, commodity retailer 106 may realize profit through price differences between retail prices paid by consumers 100 and wholesale prices paid to local providers 102. By aggregating orders from consumers 100, retailer 106 may be able to get wholesale pricing from said local providers 102.

In some embodiments, consumers 100 may be able to earn points through various actions, with points subsidizing or reducing price of the commodity. For example, in one embodiment, a user may reduce the price of heating oil by 10 cents per gallon by spending or using one hundred points. Points may be earned, in some embodiments, through social networking activities. For example, in one such embodiment, a consumer may earn points by inviting friends or neighbors to join the commodity retailer 106's system. In another example embodiment, a consumer may earn points by blogging or discussing ways to reduce energy consumption on an online forum. In yet another example embodiment, a consumer may earn points by participating in market surveys or energy consumption surveys.

In other embodiments, points may be earned through purchases from the commodity retailer 106. For example, in one such embodiment, a consumer 100 may earn 10 points for every kilowatt-hour of electricity purchased from retailer 106. In still other embodiment, points may be earned through purchases from affiliated or associated retailers. For example, retailer 106 may partner with retailers in other markets or industries, such as electronic goods or clothing. A consumer may earn points with retailer 106 in exchange for purchasing a predetermined amount of goods from the partnered retailer. For example, in one such embodiment, for every $3.62 of clothing purchased from a clothing retailer, the user may receive 10 points. In a further embodiment, the partnered retailer may pay a predetermined amount per point earned or goods purchased to retailer 106. For example, when the user purchases $3.62 of clothing or earns 10 points through purchases at a clothing retailer, the clothing retailer may pay two cents to the retailer 106, accordingly subsidizing the consumer's points. The clothing retailer may benefit through increased advertising through commodity retailer 106's system reaching new customers, as well as existing customers being driven through loyalty rewards to increase purchases through partnered retailers.

In other embodiments, points may be awarded responsive to the consumer's consumption of the commodity relative to a predetermined consumption rate. For example, in one such embodiment, a consumer 100 may earn points by using less than a predetermined amount of a commodity within a predetermined time frame. This may create a "reverse" bulk discount, whereby a consumer may receive a discount through conservation. Such discounts may be priced to correspond to the reduced delivery costs of the providers, the reduced demand through conservation, or similar relationships.

In some embodiments, points may be transferred between consumers or to organizations. In one embodiment, a consumer may transfer earned points to friends, neighbors, or other consumers in need. For example, a consumer with a surplus of points may transfer a predetermined number of points to a second, elderly consumer with a fixed income, allowing for an indirect charitable gift by reducing the second consumer's energy costs. In a similar embodiment, the consumer may transfer points to a non-profit organization, who may then distribute the points as necessary to needy consumers.

In some embodiments, commodity retailer 106 may provide for long term delivery contracts with consumers 100, with automatic delivery based on a predetermined threshold, such as the level of heating oil in a consumer's storage tank; based on consumer specifications, such as 25 gallons per month, or 50 gallons whenever the average ambient temperature is below a threshold temperature for more than a predetermined amount of time; analytics, such as average use over a period of time; or any other metric. In some embodiments in which consumer storage tanks are used, such as with heating oil, said tanks may comprise automatic level detectors. In one embodiment, the commodity retailer 106 may utilize a portal, such as a web page or application interface, to display the consumer's current tank level to the consumer 100, such that the consumer may make a determination to purchase more of the commodity. In some embodiments, commodity retailer 106 may partner with a provider of carbon offset certificates to provide certificates to consumers purchasing carbon offset credits at the point of sale.

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for an improved commodity retailer.

Section C describes embodiments of systems and methods for generating a bill for an account of a provider based on bill reduction credits.

A. Computing and Network Environment

Figure 2A:
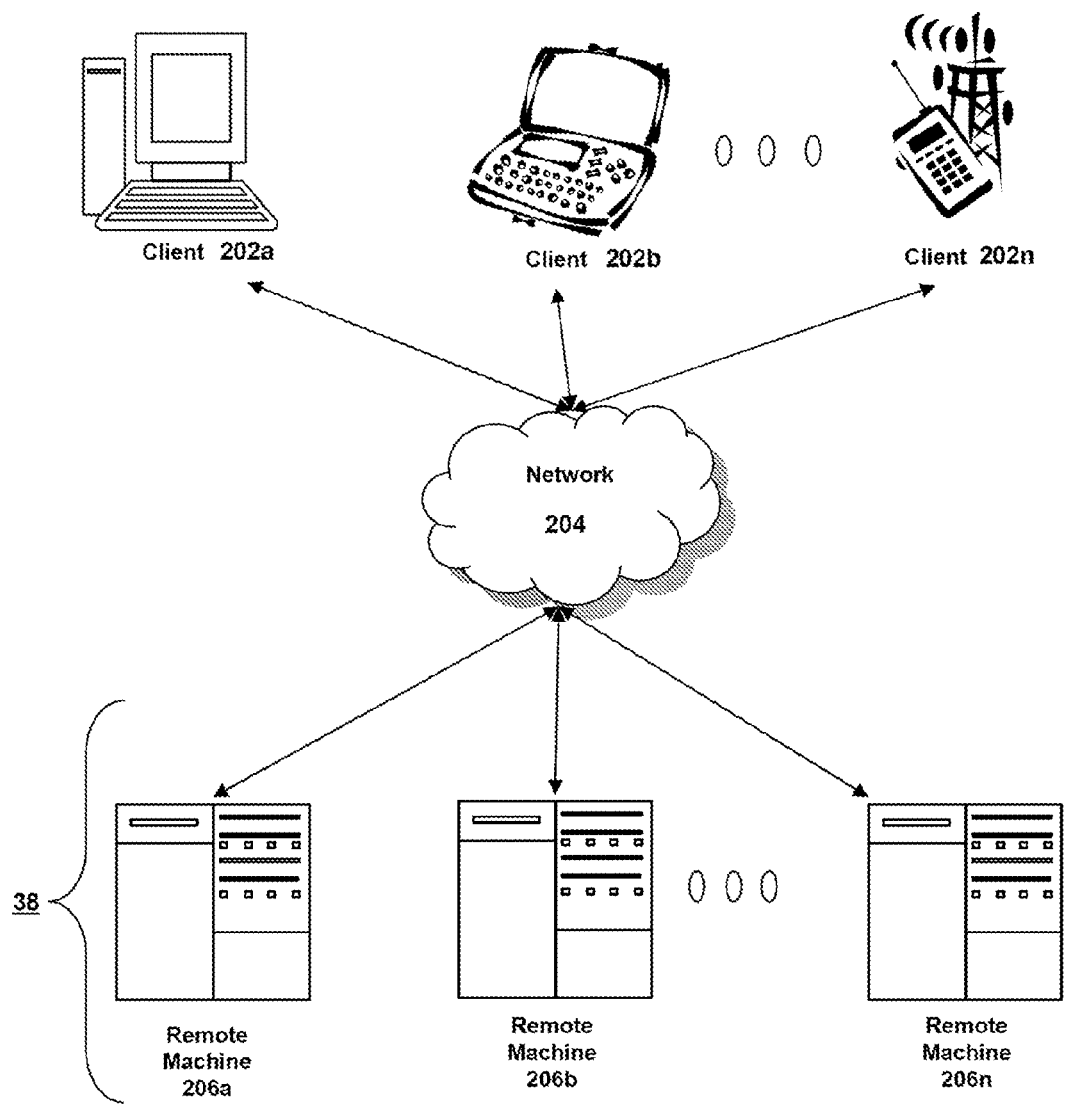
FIG. 2A is a block diagram depicting an embodiment of a network environment comprising local machines in communication with remote machines.

Prior to discussing specifics of methods and systems for an improved intermediary commodity retail system, it may be helpful to briefly discuss embodiments of networks and computing devices that may be utilized in various embodiments of these methods and systems. Referring now to FIG. 2A, an embodiment of a network environment is depicted. In brief overview, the network environment comprises one or more local machines 202a-202n (also generally referred to as local machine(s) 202, client(s) 202, client node(s) 202, client machine(s) 202, client computer(s) 202, client device(s) 202, endpoint(s) 202, or endpoint node(s) 202) in communication with one or more remote machines 206a-206n (also generally referred to as server(s) 206 or remote machine(s) 206) via one or more networks 204. In some embodiments, a local machine 202 has the capacity to function as both a client node seeking access to resources provided by a server and as a server providing access to hosted resources for other clients 202a-202n.

Although FIG. 2A shows a network 204 between the local machines 202 and the remote machines 206, the local machines 202 and the remote machines 206 may be on the same network 204. The network 204 can be a local-area network (LAN), such as a company Intranet, a metropolitan area network (MAN), or a wide area network (WAN), such as the Internet or the World Wide Web. In some embodiments, there are multiple networks 204 between the local machines 202 and the remote machines 206. In one of these embodiments, a network 204' (not shown) may be a private network and a network 204 may be a public network. In another of these embodiments, a network 204 may be a private network and a network 204' a public network. In still another embodiment, networks 204 and 204' may both be private networks. In yet another embodiment, networks 204 and 204' may both be public networks.

The network 204 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 204 may comprise a wireless link, such as an infrared channel or satellite band. The topology of the network 204 may be a bus, star, or ring network topology. The network 204 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 206. In one of these embodiments, the logical group of remote machines may be referred to as a server farm 38. In another of these embodiments, the remote machines 206 may be geographically dispersed. In other embodiments, a server farm 38 may be administered as a single entity. In still other embodiments, the server farm 38 comprises a plurality of server farms 38. The remote machines 206 within each server farm 38 can be heterogeneous—one or more of the remote machines 206 can operate according to one type of operating system platform (e.g., WINDOWS NT, WINDOWS 2003, WINDOWS 2008, WINDOWS 7 and WINDOWS Server 2008 R2, all of which are manufactured by Microsoft Corp. of Redmond, Wash.), while one or more of the other remote machines 206 can operate on according to another type of operating system platform (e.g., Unix or Linux).

The remote machines 206 of each server farm 38 do not need to be physically proximate to another remote machine 206 in the same server farm 38. Thus, the group of remote machines 206 logically grouped as a server farm 38 may be interconnected using a wide-area network (WAN) connection or a metropolitan-area network (MAN) connection. For example, a server farm 38 may include remote machines 206 physically located in different continents or different regions of a continent, country, state, city, campus, or room. Data transmission speeds between remote machines 206 in the server farm 38 can be increased if the remote machines 206 are connected using a local-area network (LAN) connection or some form of direct connection.

A remote machine 206 may be a file server, application server, web server, proxy server, appliance, network appliance, gateway, application gateway, gateway server, virtualization server, deployment server, SSL VPN server, or firewall. In some embodiments, a remote machine 206 provides a remote authentication dial-in user service, and is referred to as a RADIUS server. In other embodiments, a remote machine 206 may have the capacity to function as either an application server or as a master application server. In still other embodiments, a remote machine 206 is a blade server. In yet other embodiments, a remote machine 206 executes a virtual machine providing, to a user or client computer 202, access to a computing environment.

In one embodiment, a remote machine 206 may include an Active Directory. The remote machine 206 may be an application acceleration appliance. For embodiments in which the remote machine 206 is an application acceleration appliance, the remote machine 206 may provide functionality including firewall functionality, application firewall functionality, or load balancing functionality. In some embodiments, the remote machine 206 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 206 executes an application on behalf of a user of a local machine 202. In other embodiments, a remote machine 206 executes a virtual machine, which provides an execution session within which applications execute on behalf of a user of a local machine 202. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a local machine 202 communicates with a remote machine 206. In one embodiment, the local machine 202 communicates directly with one of the remote machines 206 in a server farm 38. In another embodiment, the local machine 202 executes a program neighborhood application to communicate with a remote machine 206 in a server farm 38. In still another embodiment, the remote machine 206 provides the functionality of a master node. In some embodiments, the local machine 202 communicates with the remote machine 206 in the server farm 38 through a network 204. Over the network 204, the local machine 202 can, for example, request execution of various applications hosted by the remote machines 206a-206n in the server farm 38 and receive output of the results of the application execution for display. In some embodiments, only a master node provides the functionality required to identify and provide address information associated with a remote machine 206b hosting a requested application.

In one embodiment, the remote machine 206 provides the functionality of a web server. In another embodiment, the remote machine 206a receives requests from the local machine 202, forwards the requests to a second remote machine 206b and responds to the request by the local machine 202 with a response to the request from the remote machine 206b. In still another embodiment, the remote machine 206a acquires an enumeration of applications available to the local machine 202 and address information associated with a remote machine 206b hosting an application identified by the enumeration of applications. In yet another embodiment, the remote machine 206 presents the response to the request to the local machine 202 using a web interface. In one embodiment, the local machine 202 communicates directly with the remote machine 206 to access the identified application. In another embodiment, the local machine 202 receives output data, such as display data, generated by an execution of the identified application on the remote machine 206.

In some embodiments, the remote machine 206 or a server farm 38 may be running one or more applications, such as an application providing a thin-client computing or remote display presentation application. In one embodiment, the remote machine 206 or server farm 38 executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 206 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 202 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on local machine 202. In some embodiments, the application may be a server-based or a remote-based application executed on behalf of the local machine 202 on a remote machine 206. In other embodiments, the remote machine 206 may display output to the local machine 202 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

Figure 2B:
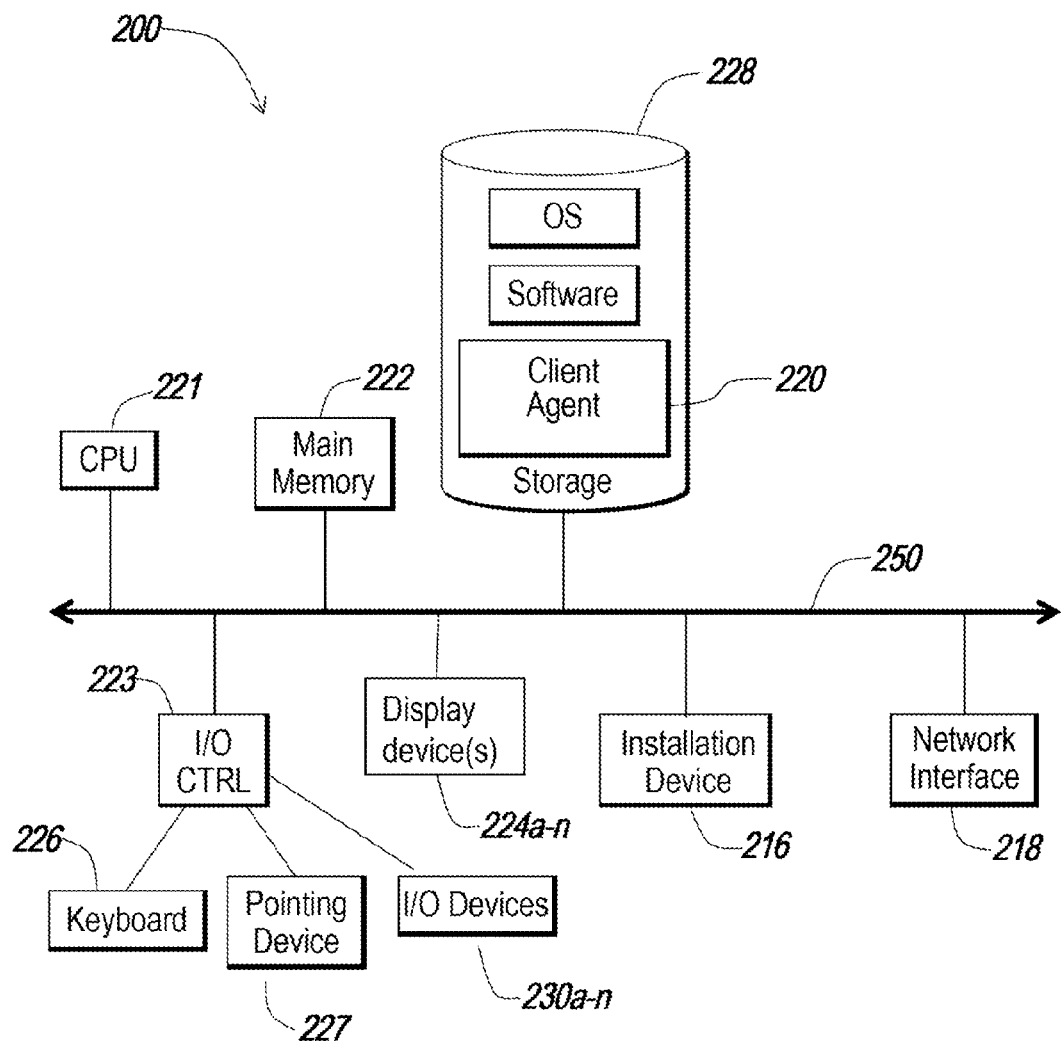
FIGS. 2B-2E are block diagrams depicting embodiments of computers useful in connection with the methods and systems described herein.
Figure 2C:
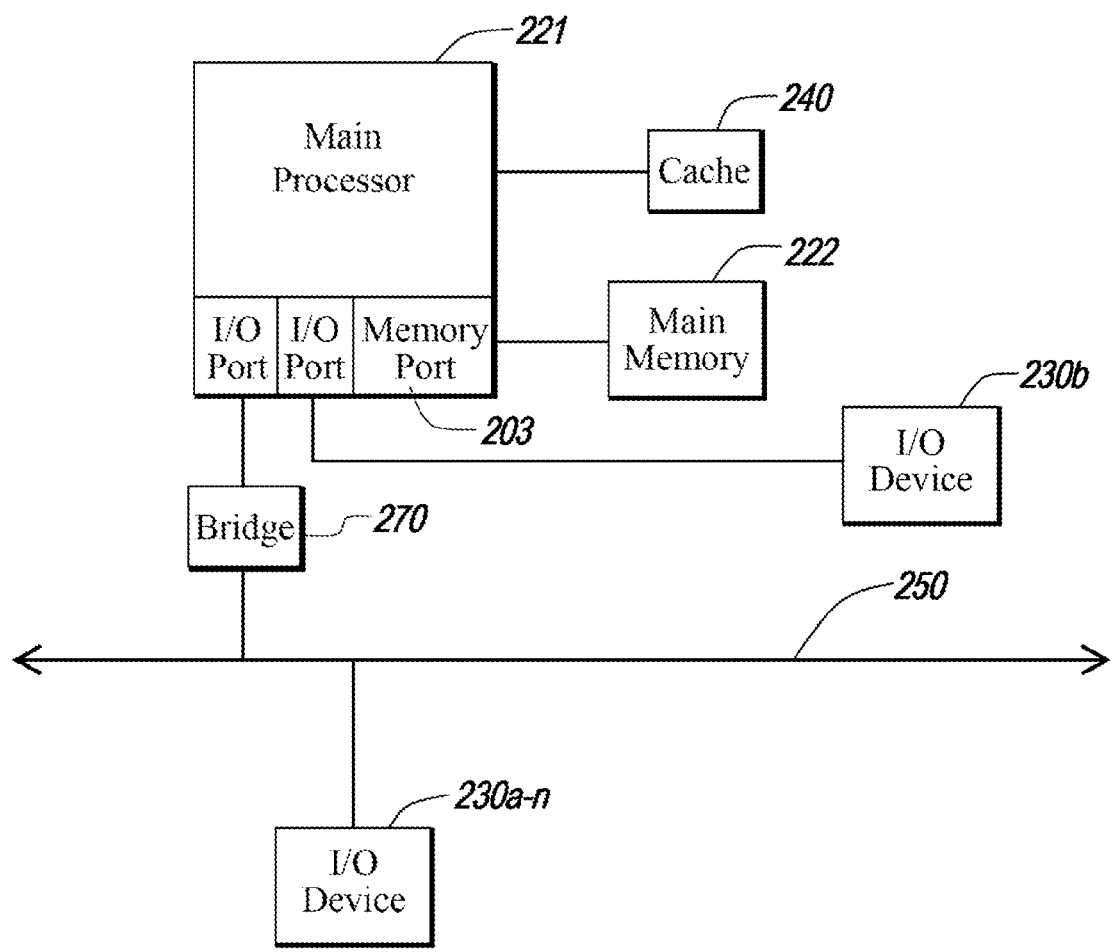

The local machine 202 and remote machine 206 may be deployed as and/or executed on any type and form of computing device, such as a computer, network device or appliance capable of communicating on any type and form of network and performing the operations described herein. FIGS. 2B and 2C depict block diagrams of a computing device 200 useful for practicing an embodiment of the local machine 202 or a remote machine 206. As shown in FIGS. 2B and 2C, each computing device 200 includes a central processing unit 221, and a main memory unit 222. As shown in FIG. 2B, a computing device 200 may include a storage device 228, an installation device 216, a network interface 218, an I/O controller 223, display devices 224a-n, a keyboard 226 and a pointing device 227, such as a mouse. The storage device 228 may include, without limitation, an operating system, software, and a client agent 220. As shown in FIG. 2C, each computing device 200 may also include additional optional elements, such as a memory port 203, a bridge 270, one or more input/output devices 230a-230n (generally referred to using reference numeral 230), and a cache memory 240 in communication with the central processing unit 221.

The central processing unit 221 is any logic circuitry that responds to and processes instructions fetched from the main memory unit 222. In many embodiments, the central processing unit 221 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein.

Main memory unit 222 may be one or more memory chips capable of storing data and allowing any storage location to be directly accessed by the microprocessor 221, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 222 may be based on any of the above described memory chips, or any other available memory chips capable of operating as described herein. In the embodiment shown in FIG. 2B, the processor 221 communicates with main memory 222 via a system bus 250 (described in more detail below). FIG. 2C depicts an embodiment of a computing device 200 in which the processor communicates directly with main memory 222 via a memory port 203. For example, in FIG. 2C the main memory 222 may be DRDRAM.

FIG. 2C depicts an embodiment in which the main processor 221 communicates directly with cache memory 240 via a secondary bus, sometimes referred to as a backside bus. In other embodiments, the main processor 221 communicates with cache memory 240 using the system bus 250. Cache memory 240 typically has a faster response time than main memory 222 and is typically provided by SRAM, BSRAM, or EDRAM. In the embodiment shown in FIG. 2B, the processor 221 communicates with various I/O devices 230 via a local system bus 250. Various buses may be used to connect the central processing unit 221 to any of the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 224, the processor 221 may use an Advanced Graphics Port (AGP) to communicate with the display 224. FIG. 2C depicts an embodiment of a computer device 200 in which the main processor 221 communicates directly with I/O device 230b via HYPERTRANSPORT, RAPIDIO, or INFINIBAND communications technology. FIG. 2C also depicts an embodiment in which local busses and direct communication are mixed: the processor 221 communicates with I/O device 230a using a local interconnect bus while communicating with I/O device 230b directly.

A wide variety of I/O devices 230a-230n may be present in the computing device 200. Input devices include keyboards, mice, trackpads, trackballs, microphones, and drawing tablets. Output devices include video displays, speakers, inkjet printers, laser printers, and dye-sublimation printers. An I/O controller 223, as shown in FIG. 2B, may control the I/O devices. The I/O controller may control one or more I/O devices such as a keyboard 226 and a pointing device 227, e.g., a mouse or optical pen. Furthermore, an I/O device may also provide storage and/or an installation medium 216 for the computing device 200. In still other embodiments, the computing device 200 may provide USB connections (not shown) to receive handheld USB storage devices such as the USB Flash Drive line of devices manufactured by Twintech Industry, Inc. of Los Alamitos, Calif.

Referring again to FIG. 2B, the computing device 200 may support any suitable installation device 216, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 200 may further comprise a storage device, such as one or more hard disk drives or redundant arrays of independent disks, for storing an operating system and other related software, and for storing application software programs such as any program related to the client agent 220. Optionally, any of the installation devices 216 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 200 may include a network interface 218 to interface to the network 204 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 200 communicates with other computing devices 200' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 218 may comprise a built-in network adapter, network interface card, PCMCIA network card, card bus network adapter, wireless network adapter, USB network adapter, modem or any other device suitable for interfacing the computing device 200 to any type of network capable of communication and performing the operations described herein.

In some embodiments, the computing device 200 may comprise or be connected to multiple display devices 224a-224n, which each may be of the same or different type and/or form. As such, any of the I/O devices 230a-230n and/or the I/O controller 223 may comprise any type and/or form of suitable hardware, software, or combination of hardware and software to support, enable or provide for the connection and use of multiple display devices 224a-224n by the computing device 200. For example, the computing device 200 may include any type and/or form of video adapter, video card, driver, and/or library to interface, communicate, connect or otherwise use the display devices 224a-224n. In one embodiment, a video adapter may comprise multiple connectors to interface to multiple display devices 224a-224n. In other embodiments, the computing device 200 may include multiple video adapters, with each video adapter connected to one or more of the display devices 224a-224n. In some embodiments, any portion of the operating system of the computing device 200 may be configured for using multiple displays 224a-224n. In other embodiments, one or more of the display devices 224a-224n may be provided by one or more other computing devices, such as computing devices 200a and 200b connected to the computing device 200, for example, via a network. These embodiments may include any type of software designed and constructed to use another computer's display device as a second display device 224a for the computing device 200. One ordinarily skilled in the art will recognize and appreciate the various ways and embodiments that a computing device 200 may be configured to have multiple display devices 224a-224n.

In further embodiments, an I/O device 230 may be a bridge between the system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus, or any other type and form of communication bus.

A computing device 200 of the sort depicted in FIGS. 2B and 2C typically operates under the control of operating systems, which control scheduling of tasks and access to system resources. The computing device 200 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 200 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 200 may have different processors, operating systems, and input devices consistent with the device. For example, in one embodiment, the computing device 200 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, i335, i365, i570, i576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is a device in the iPhone line of smartphones, manufactured by Apple Inc., of Cupertino, Calif. In still other embodiments, the computing device 200 may comprise a tablet computer, such as an iPad tablet computer manufactured by Apple, Inc., or any other type and form of tablet computer.

In one embodiment, a computing device 202a may request resources from a remote machine 206, while providing the functionality of a remote machine 206 to a client 202b. In such an embodiment, the computing device 202a may be referred to as a client with respect to data received from the remote machine 206 (which may be referred to as a server) and the computing device 202a may be referred to as a server with respect to the second client 202b. In another embodiment, the client 202 may request resources from the remote machine 206 on behalf of a user of the client 202.

Figure 2D:
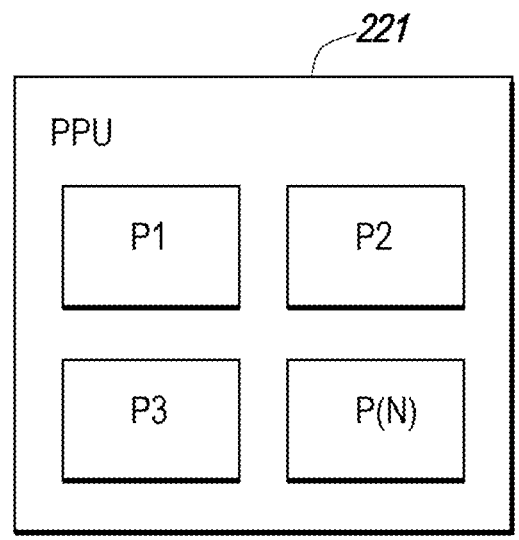

As shown in FIG. 2D, the computing device 200 may comprise multiple processors and may provide functionality for simultaneous execution of instructions or for simultaneous execution of one instruction on more than one piece of data. In some embodiments, the computing device 200 may comprise a parallel processor with one or more cores. In one of these embodiments, the computing device 200 is a shared memory parallel device, with multiple processors and/or multiple processor cores, accessing all available memory as a single global address space. In another of these embodiments, the computing device 200 is a distributed memory parallel device with multiple processors each accessing local memory only. In still another of these embodiments, the computing device 200 has both some memory which is shared and some memory which can only be accessed by particular processors or subsets of processors. In still even another of these embodiments, the computing device 200, such as a multicore microprocessor, combines two or more independent processors into a single package, often a single integrated circuit (IC). In yet another of these embodiments, the computing device 200 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 2E:
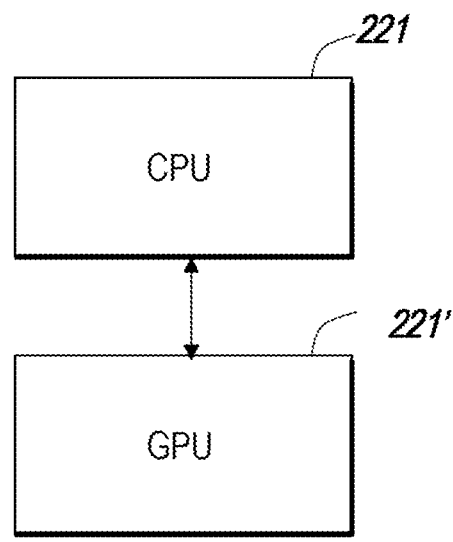

In some embodiments, the computing device 200 may comprise a graphics processing unit. In one of these embodiments, depicted in FIG. 2E, the computing device 200 includes at least one central processing unit 221 and at least one graphics processing unit. In another of these embodiments, the computing device 200 includes at least one parallel processing unit and at least one graphics processing unit. In still another of these embodiments, the computing device 200 includes a plurality of processing units of any type, one of the plurality of processing units comprising a graphics processing unit.

In one embodiment, a resource may be a program, an application, a document, a file, a plurality of applications, a plurality of files, an executable program file, a desktop environment, a computing environment, or other resource made available to a user of the local computing device 202. The resource may be delivered to the local computing device 202 via a plurality of access methods including, but not limited to, conventional installation directly on the local computing device 202, delivery to the local computing device 202 via a method for application streaming, delivery to the local computing device 202 of output data generated by an execution of the resource on a third computing device 206b and communicated to the local computing device 202 via a presentation layer protocol, delivery to the local computing device 202 of output data generated by an execution of the resource via a virtual machine executing on a remote computing device 206, or execution from a removable storage device connected to the local computing device 202, such as a USB device, or via a virtual machine executing on the local computing device 202 and generating output data. In some embodiments, the local computing device 202 transmits output data generated by the execution of the resource to another client computing device 202b.

In some embodiments, a user of a local computing device 202 connects to a remote computing device 206 and views a display on the local computing device 202 of a local version of a remote desktop environment, comprising a plurality of data objects, generated on the remote computing device 206. In one of these embodiments, at least one resource is provided to the user by the remote computing device 206 (or by a second remote computing device 206b) and displayed in the remote desktop environment. However, there may be resources that the user executes on the local computing device 202, either by choice, or due to a policy or technological requirement. In another of these embodiments, the user of the local computing device 202 would prefer an integrated desktop environment providing access to all of the resources available to the user, instead of separate desktop environments for resources provided by separate machines. For example, a user may find navigating between multiple graphical displays confusing and difficult to use productively. Or, a user may wish to use the data generated by one application provided by one machine in conjunction with another resource provided by a different machine. In still another of these embodiments, requests for execution of a resource, windowing moves, application minimize/maximize, resizing windows, and termination of executing resources may be controlled by interacting with a remote desktop environment that integrates the display of the remote resources and of the local resources. In yet another of these embodiments, an application or other resource accessible via an integrated desktop environment—including those resources executed on the local computing device 202 and those executed on the remote computing device 206—is shown in a single desktop environment.

In one embodiment, data objects from a remote computing device 206 are integrated into a desktop environment generated by the local computing device 202. In another embodiment, the remote computing device 206 maintains the integrated desktop. In still another embodiment, the local computing device 202 maintains the integrated desktop.

In some embodiments, a single remote desktop environment 204 is displayed. In one of these embodiments, the remote desktop environment 204 is displayed as a full-screen desktop. In other embodiments, a plurality of remote desktop environments 204 is displayed. In one of these embodiments, one or more of the remote desktop environments are displayed in non-full-screen mode on one or more display devices 224. In another of these embodiments, the remote desktop environments are displayed in full-screen mode on individual display devices. In still another of these embodiments, one or more of the remote desktop environments are displayed in full-screen mode on one or more display devices 224.

B. Improved Commodity Retailer

Figure 3:
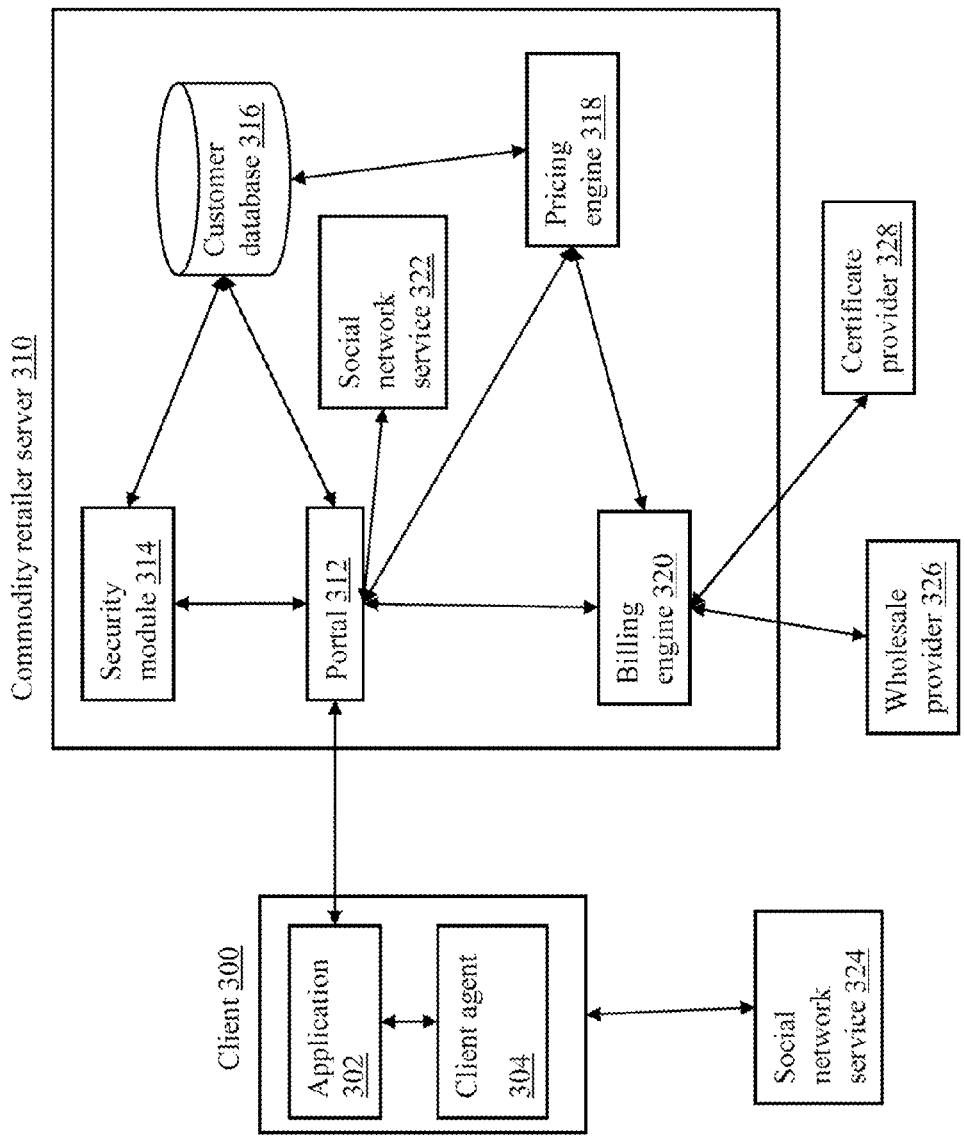
FIG. 3 is a block diagram of an embodiment of a system for an improved commodity retailer.

Referring now to FIG. 3, illustrated is a block diagram of a system for improved commodity pricing and sales. In brief overview, a client computing device 300 executed by a user or consumer may connect via a network, such as the Internet, to a host or server computing device executed by a commodity retailer 310, sometimes referred to as a commodity purchase portal, a commodity intermediary, an intermediary retailer, or via similar terms. In some embodiments, client 300 may comprise an application 302, such as a web browser or application communicating with commodity retailer 310. In a further embodiment, client 300 may comprise a client agent 304. The server computing device executed by commodity retailer 310, referred to herein as commodity retailer 310, may comprise, in some embodiments, a portal 312, a security module 314, a customer database 316, a pricing engine 318, and a billing engine 320. In some embodiments, commodity retailer 310 may comprise a social network service 322, such as a blog, forum, or other service. In some embodiments, client 300 and/or commodity retailer 310 may communicate via a network with a third-party social network service 324. Commodity retailer 310 may also communicate with one or more wholesale commodity providers or local providers 326, and, in some embodiments, one or more carbon offset certificate providers 328. Although illustrated as a single server 310, in many embodiments, one or more modules of server 310 may be executed by separate servers, by a server farm, by virtual machines hosted in a cloud service, or via other similar means.

Still referring to FIG. 3 and in more detail, in some embodiments, a first computing device 300, referred to variously as a client, computing device operated on behalf of a user, mobile computing device, remote computing device, or via similar terminology may connect via a network to a second computing device 310, referred to variously as a server, host computing device, computing device operated on behalf of a commodity retailer, or commodity retailer 310 or via similar terminology. The network may comprise any type or form of network, such as those discussed above. In some embodiments, the client computing device 300 may execute an application 302 for communicating with server 310. Application 302 may comprise an application, service, daemon, routine, or other executable logic. In some embodiments, application 302 may comprise a web browser, while in other embodiments, application 302 may comprise a dedicated communication application, widget, desktop application, or other application. In embodiments in which client 300 comprises a smart phone, tablet, or other mobile computing device, application 302 may comprise an "App" or dedicated application for communicating with server 310.

In some embodiments, client 300 may execute a client agent 304. Client agent 304 may comprise an application, service, daemon, routine, or other executable logic for monitoring interactions of a user of client 300 and communicating interactions to server 310. In some embodiments, client agent 304 may comprise functionality for receiving notifications of potential point earning opportunities and communicating the notifications to a user of client 300. For example, in one embodiment, client agent 304 may comprise a toolbar application or extension executed by a web browser 302. The toolbar may comprise functionality for monitoring a user's interactions with third party websites. In some embodiments, the toolbar may communicate notifications of the interactions to server 310, and receive identifications of opportunities or points earned. An interaction may comprise visiting a third party website; purchasing goods; reviewing a product; posting to a blog or forum; positively marking the website, such as with the "like" function or "+1" function provided by the Facebook social networking service provided by Facebook, Inc., or the Google+ social networking service provided by Google, Inc., respectively; or performing other interactions with third party websites. In one embodiment, for example, the toolbar may determine that the user has visited a website of a specific clothing retailer. In some embodiments, the toolbar may communicate an identification of the website to server 310. Server 310 may identify the website as belonging to a third-party retailer that has partnered with the commodity retailer, and may identify one or more point opportunities associated with the third-party retailer. For example, a point opportunity may comprise an opportunity for the user to earn a predetermined amount of points for every n dollars spent at the third party retailer's website. Server 310 may transmit an identification of the opportunity to the client agent 304 for display to the user. The client agent 304 may monitor the user's further interactions with the site, such as placing an order or performing other functions that are associated with point opportunities, and may transmit notifications to server 310 of the user's point-earning notifications. For example, in one such embodiment, a user may visit an online book seller. The client agent 304 may transmit an identification of the seller to server 310, which may search a point opportunity database for associated opportunities. Upon finding an opportunity, server 310 may transmit an identification of the opportunity and relevant information to client agent 304, such as "10 points for every $3.20 purchased" or "5 points for every book review left at the site" or "1 point for each third-party review identified as helpful or not helpful" or any other similar opportunities. In many embodiments, such information may be encoded as data strings identifying elements of the site, such as POST tags associated with forms. The client agent 304 may present the opportunity or opportunities to the user, such as via a pop-up window, balloon notification, scrolling notification in a status bar, or other user interface elements. The client agent 304 may monitor the user's interactions with the site or with identified elements of the site, may parse shopping carts or checkout receipts, or perform similar functions for identifying when a user has earned points by meeting the requirements of the point opportunity. In some embodiments, client agent 304 may transmit a notification of the earned points or fulfilled opportunity to server 310 for crediting a point balance of the user's account, and may present the user with an identification of the points earned. In many embodiments, client agent 304 may comprise functionality for logging into or supplying user credentials to server 310 by the user, so that earned points may be associated with the user. In a further embodiment, client agent 304 may display a current point balance for the user, the point balance retrieved from server 310. In many embodiments, client agent 304 may remain logged in to server 310 or save login information for re-use, even as the user closes web pages associated with server 310.

In some embodiments, client agent 304 may comprise a database of point opportunities, and as such, may not need to communicate with server 310 to identify point opportunities at third-party retailer sites and notify the user. In a further embodiment, client agent 304 may receive periodic notifications or updates from server 310, identifying new point opportunities or removing expired opportunities. This may reduce bandwidth required. In still other embodiments, client agent 304 may identify point opportunities responsive to code within the third-party retailer's web page or on a related page, such as within XML code. For security against unaffiliated third-party retailers inducing users to spend money with misleading or false point opportunities, client agent 304 may transmit an identification of the identified point opportunities to server 310 for verification. In one embodiment, such identification may comprise a hash of the point opportunity, reducing bandwidth required.

In some embodiments, in addition to visiting third-party retailers, a user may use client 300 to communicate with social networking services 324, such as Facebook or Google+. As discussed above, client agent 304 may monitor user interactions with social networking services 324, such as posting to forums or blogs, commenting or discussing with others, or positively rating elements. In some embodiments, client agent 304 may monitor forum posts or comments for words or phrases related to the commodity retailer, such as "heating oil," "energy consumption," "green energy," "electricity," "points," the retailer name, or other phrases that indicate the user is discussing the commodity retailer. Point opportunities may be associated with discussing the commodity retailer, as a way to increase word-of-mouth advertising. In one embodiment, points may be awarded based on the number of mentions within a post, or the number of posts including mentions. In some embodiments, to discourage spamming, points may be reduced or not granted for messages that simply contain the related words, or for messages that include a high number or high proportion of related words. In some embodiments, client agent 304 may parse messages for positive words or negative words, such as "like," "dislike," or similar phrases to indicate whether a message encourages or discourages others from visiting the retailer's site.

Figure 4A:
FIGS. 4A-4E are example screenshots of embodiments of a portal for commodity purchasing.

In some embodiments, server 310 may comprise a portal 312. Portal 312 may comprise an application, service, web page, script, or other interface for allowing a user to log in, interact with features provided by server 310, monitor the user's point balance, place an order for one or more commodities or services, or perform other functions. For example, referring briefly ahead to FIGS. 4A-4E, illustrated are example screenshots of embodiments of a portal 312 for the systems and methods discussed herein. As shown in FIG. 4A, a portal may comprise a landing page or initial page viewed by visitors or users. The portal may provide functionality for signing up and/or logging in (e.g. providing user credentials, passwords, address information, etc.). In some embodiments, the portal may identify top point earners 402 and/or the lowest price paid for a commodity by users 404 to encourage consumers to participate.

Figure 4B:
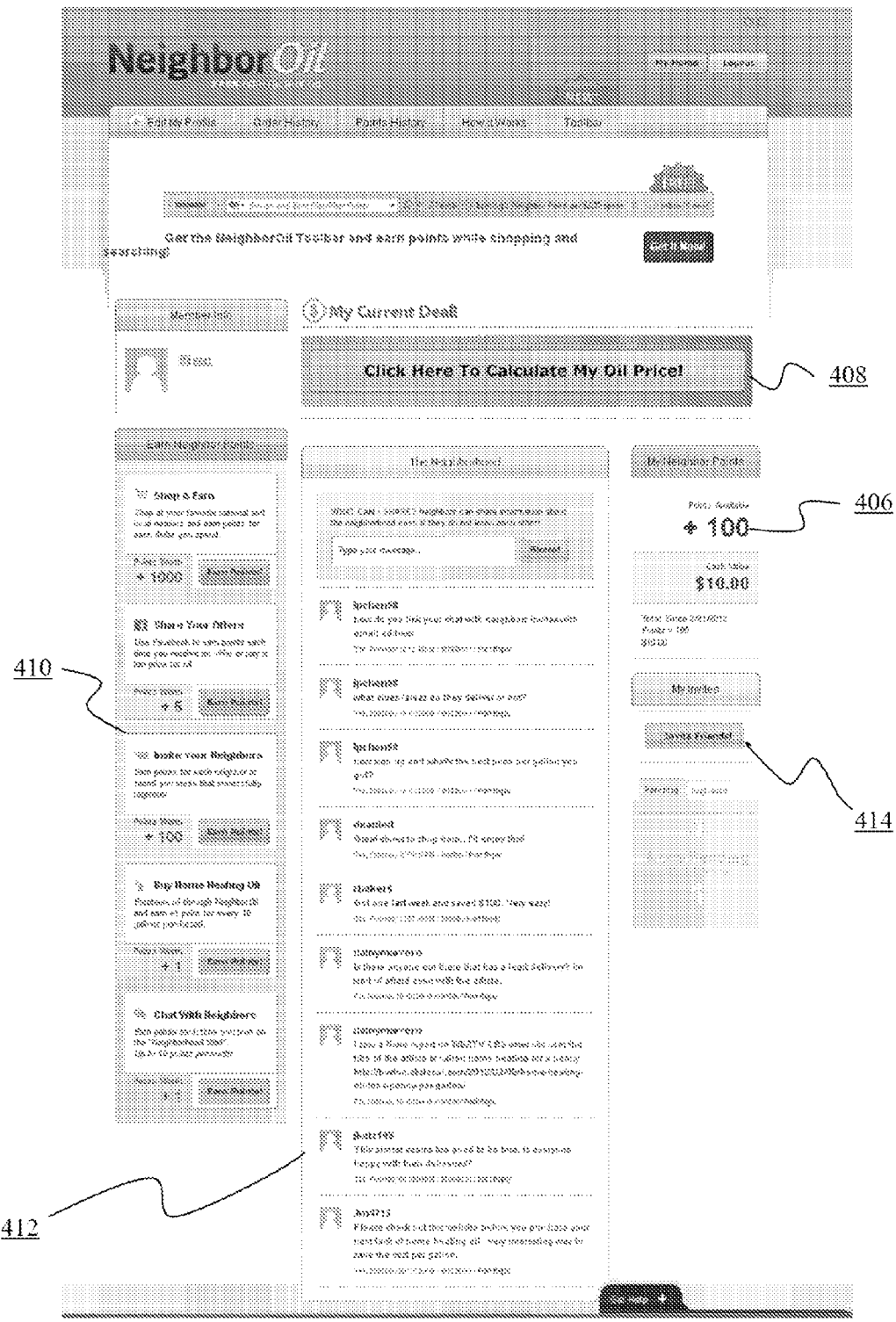
Figure 4C:
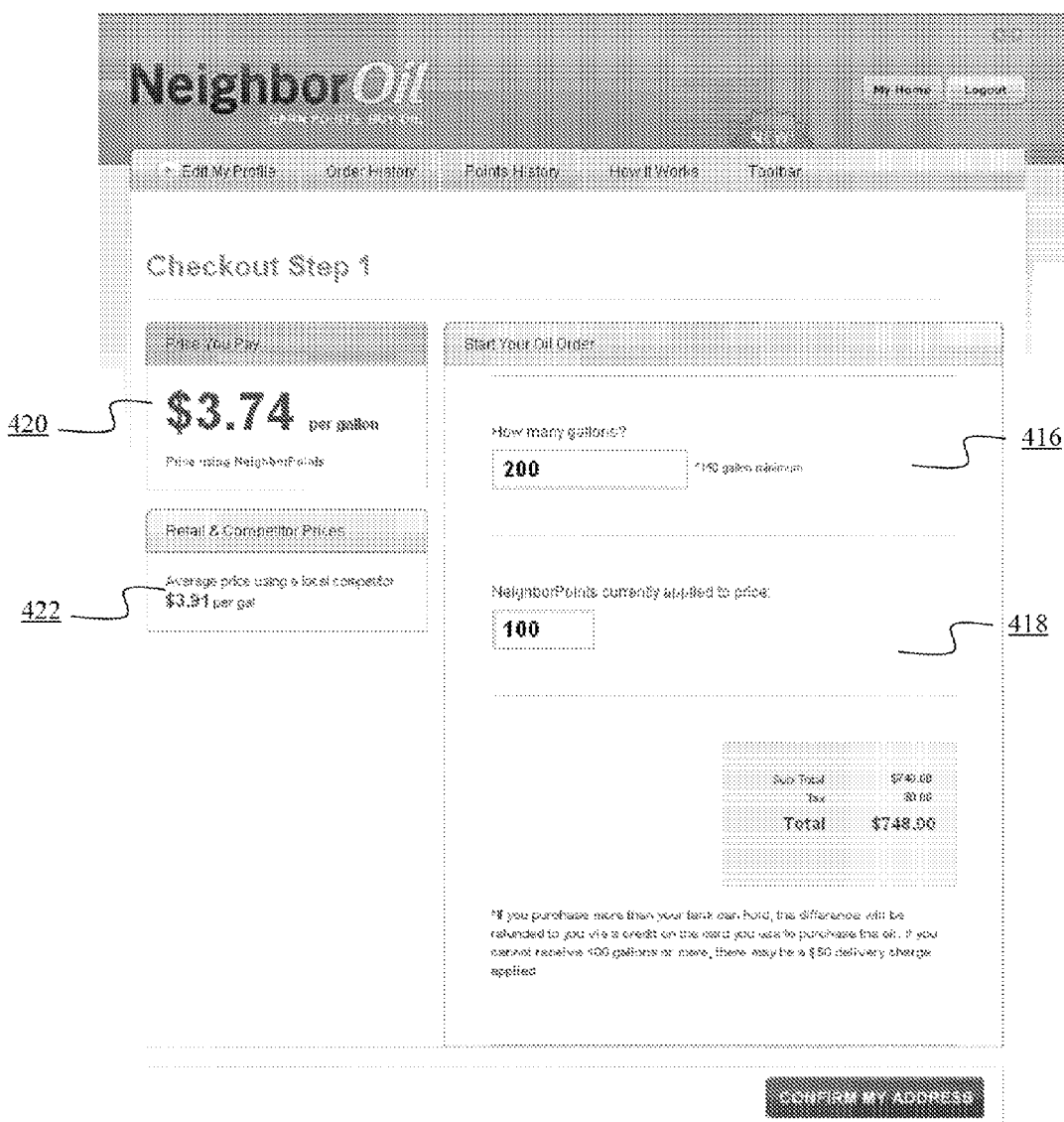

FIG. 4B is an example screenshot of an embodiment of the portal displayed after a user or consumer has logged in. In some embodiments, the page may comprise an identification of the user's current point balance 406; a link to purchase an amount of a commodity 408; an identification of one or more current point opportunities 410; a social network service 412 such as a forum, wall, feed, or similar service; or a link to invite friends to join the service 414. Responsive to a user requesting to purchase an amount of a commodity, the portal may display a price display and confirmation page as shown in the example embodiment depicted in FIG. 4C. In some embodiments, the price display and confirmation page may comprise fields for allowing the user to specify an amount of the commodity to purchase 416, such as gallons of fuel or kilowatt hours of electricity. In some embodiments, the user may specify a number of points to apply to the order 418, while in other embodiments, some or all of the user's points may be applied automatically. In some embodiments, the portal may display a calculated price for the user 420 and/or a default price 422. The calculated price may comprise a reduced price based on the market rate for the amount of the commodity purchased, reduced by any bulk discount applied for large orders, and further subsidized or reduced by applying points.

Figure 4D:
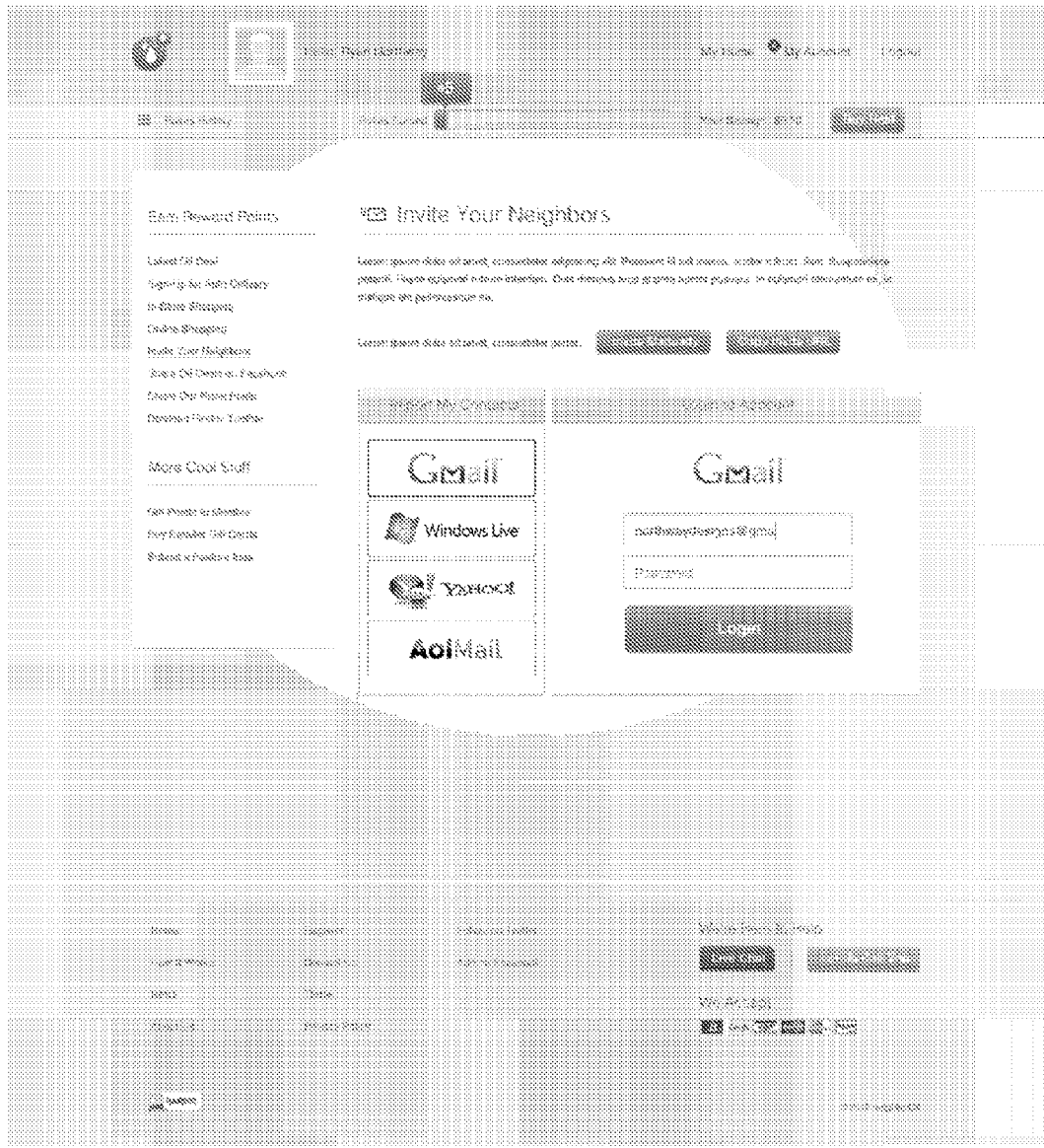
Figure 4E:
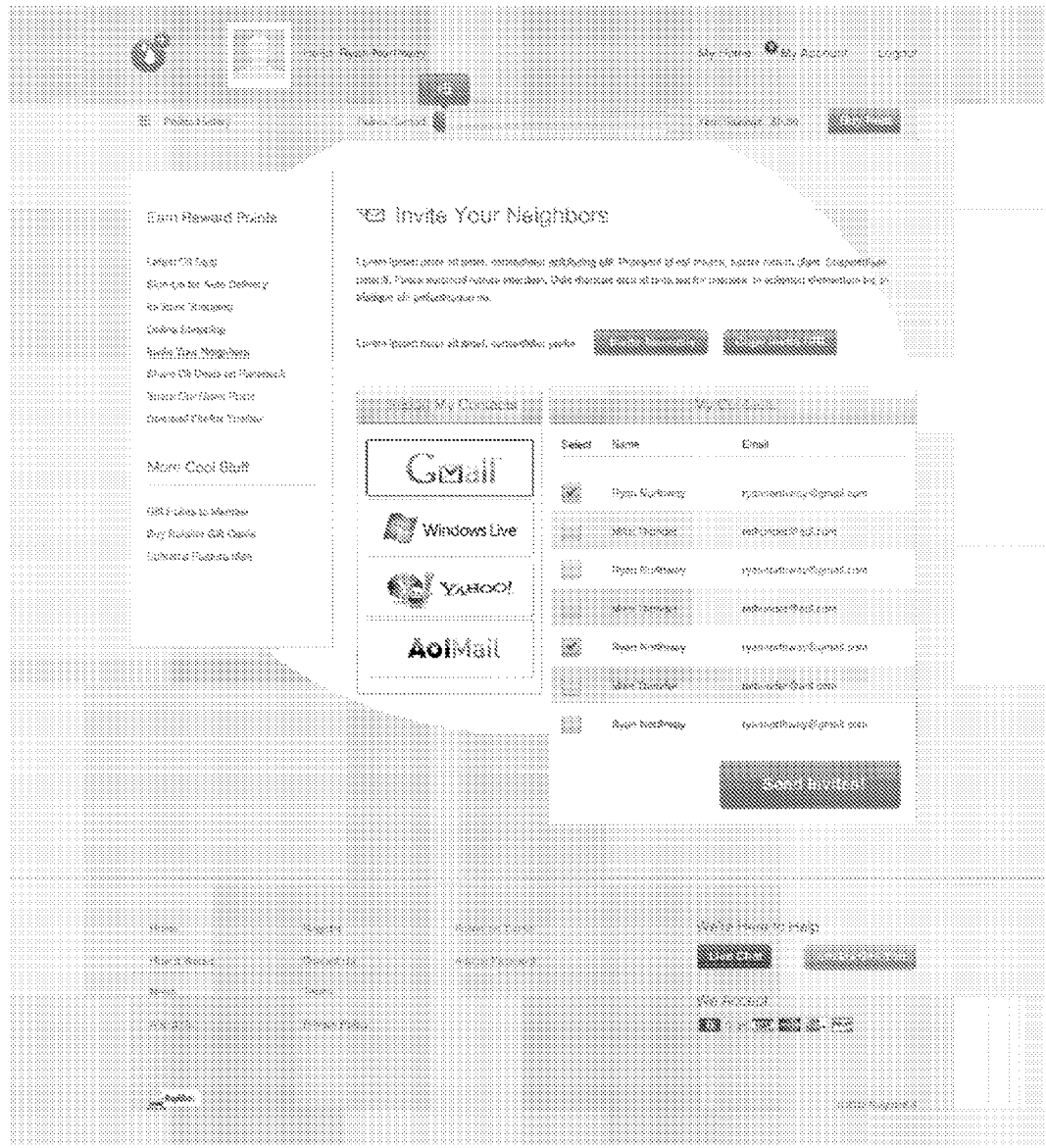
Figure 4F:
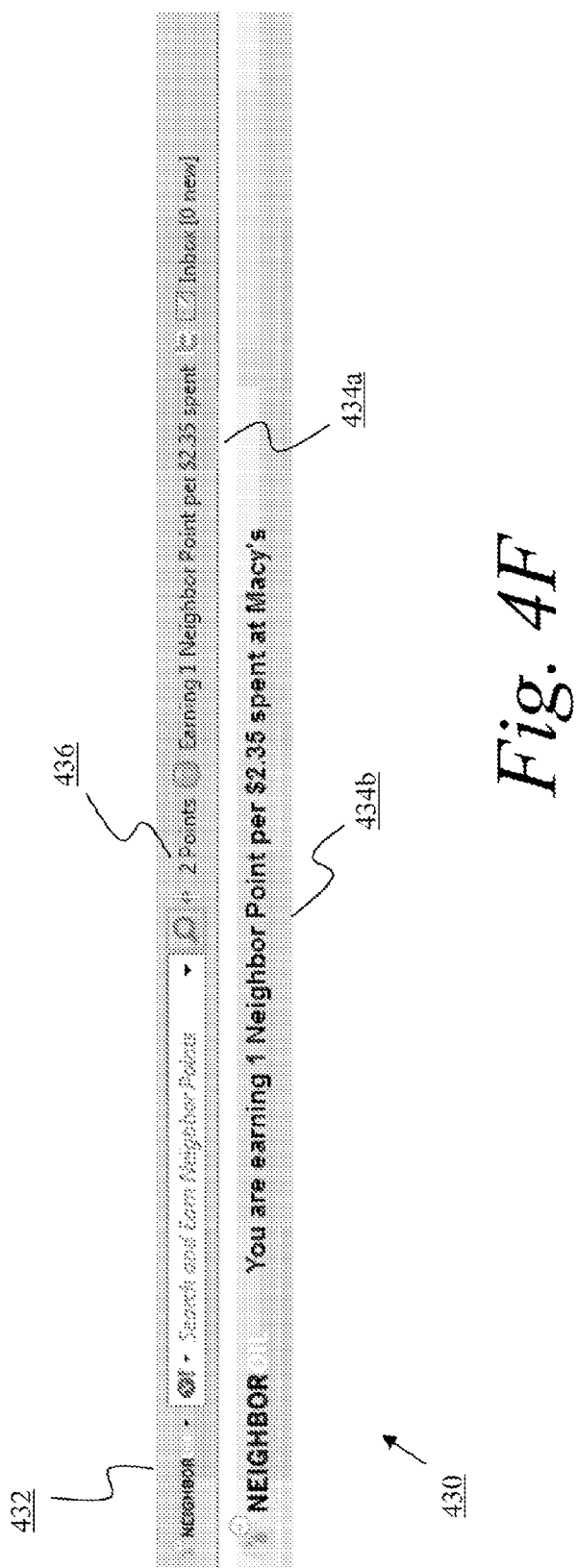
FIG. 4F is an example screenshots of an embodiment of a client agent user interface for monitoring point earning opportunities.

In some embodiments, as shown in the example screenshots of embodiments depicted in FIGS. 4D and 4E, a user may invite friends to join the service. In many embodiments, the user may log in to a third party service, such as an email provider, and the portal may retrieve an address book from the third party service so that the user may select friends to invite.

As discussed above, in many embodiments, a client agent executing on the consumer's computing device may comprise a toolbar, as shown in the example screenshot of an embodiment of a client agent user interface 430 depicted in FIG. 4E. Client agent user interface 430 may comprise a toolbar 432, including search functionality and access to email or social networking services. In some embodiments, responsive to the user visiting a third-party retailer, as discussed above, the client agent may display an identification of a point opportunity 434a-434b to the user, referred to generally as identifications of point opportunities 434. The identification of the point opportunity 434 may comprise a text status within the toolbar as shown at 434a, or may comprise a status bar that extends from toolbar 432, as shown at 434b. In some embodiments, the extending bar may be animated to display when the user first visits the site, and then retract after a predetermined time period. In some embodiments, the user interface may display a current point balance 436 or a total number of points earned at the third party site during the session.

Returning to FIG. 3, in some embodiments, a server 310 may comprise a security module 314. Security module 314 may comprise an application, service, server, daemon, or other executable logic for receiving and verifying user credentials against a customer database 316. Security module 314 may comprise functionality for allowing a user to register or log in through portal 312 to interact with server 310.

In some embodiments, server 310 may comprise a customer database 316. Customer database 316 may comprise a database, flat file, array, or other data file for storing identification of consumers, customers, or users. In some embodiments, database 316 may be stored on server 310, while in other embodiments, database 316 may be stored on a separate storage server, external storage device, or in a network storage system. Database 316 may comprise identifications of each user, login name or account name, password, real name, address, point balance, credit card or bank account information, third-party service credentials such as email account or social network service account credentials. In some embodiments, database 316 may further comprise data regarding commodity consumption by the user, including amounts ordered or consumed over various time periods, order histories, or other information. In still other embodiments, database 316 may comprise data regarding a user's interactions with third-party services to earn point opportunities, such as an amount spent at a third-party retailer over various time periods or an amount earned for actions taken through social networking accounts of the user. This may be valuable for targeted marketing, demographic analysis, or other similar functions.

In some embodiments, the server 310 can track the users activities at third party retail locations and websites. In some embodiments, the service may receive a request from the user to earn points by shopping at a particular third party retail store. In some embodiments, the server may track the user's activities by tracking the user's retail activity via the user's store loyalty card for that particular store. In some embodiments, the server may require that the user register the store loyalty card with the server 310. In some embodiments, server 310 may issue a store loyalty card for the user electronically and the retailer may provide the store loyalty card to the consumer. In some embodiments, server 310 may issue a store loyalty card for the user that can be used at one or more of the third party retail stores or websites that have partnered with the commodity retailer. In some embodiments, upon registering or creating the store loyalty card, the user can select one or more point earning opportunities provided by the server at the particular third party retail store or website. Once the user selects the one or more point earning opportunities, the server 310 activates the selected point earning opportunities for the user. As such, any purchases the user makes after the point earning opportunities are activated can be rewarded with points that can be used to pay for the one or more services provided by one or more of the providers 326.

In some embodiments, service 310 may execute a pricing engine 318. Pricing engine 318 may comprise an application, service, daemon, or other executable logic for calculating point balances responsive to receiving identification of a user fulfilling a point earning opportunity, and calculating reduced prices for a commodity responsive to point balances or subsidizing of the commodity via points. In some embodiments, points may be worth a predetermined amount based on a points conversion schedule, and pricing engine 318 may reduce a price to be paid by a consumer for a commodity order by deducting the amount of a cash value corresponding to the points being converted from a calculated total for the order. For example, given a commodity with a market price of $4 per unit, and a consumer ordering 200 units, pricing engine 318 may calculate a gross price of $800. If the consumer has 200 points worth $0.50 each according to a price conversion schedule and the consumer selects to convert the 200 points to a cash value, the pricing engine 318 may reduce the gross price by the cash value, which is a corresponding $100. In some embodiments, pricing engine 318 may calculate an updated price responsive to the reduction for display to the consumer. In some embodiments, pricing engine 318 can calculate a net price per unit by dividing updated price with the number of units purchased. For example, given the above amounts, the pricing engine may display a net price of $3.50 per unit, or that the consumer has saved $0.50 per unit through the use of points. In some embodiments, pricing engine 318 may apply bulk discounts to large orders, and/or may calculate taxes and delivery fees. In some embodiments, pricing engine 318 may determine the market price for the commodity. In one embodiment, the market price may be based on one or more local provider prices for the commodity, or may comprise an average of said local provider prices. In another embodiment, the market price may be based on a wholesale price from a wholesale commodity provider, and further based on a predetermined profit margin for local providers and the intermediary retailer. For example, in one such embodiment, a wholesale price of $3 per unit may be marked up to $4 per unit as market price, responsive to a 33% markup divided between the local provider and the intermediary retailer.

The consumer retailer may use monies received or credited from third-party web-site affiliates/partners, service providers and/or advertisers to support, provide or enable the conversion of points to cash value or credit to the consumer. The retailer may receive monies or credits from the difference in whole sale price offered to the retailer by the service provider and retail price offered to the consumer. The retailer may receive monies or credits from third-party web site affiliates or partners corresponding to or based on a number of points that the consumer retailer will provide or give to the consumer for the purchase. The retailer may receive monies or credits from third-party web site affiliates or partners based on the amount of purchase by the consumer via the third-party web site. The retailer may receive monies or credits via subsidiaries from the service provider and/or third party web site. The retailer may receive monies from advertisers for advertisement, such as to the consumers via the retailer's web-site. Via the collection of, accounting of or consideration of the monies and credits from these different sources, the consumer retailer can determine how to convert points to cash, how to price services while making a profit In some embodiments, server 310 may comprise a billing engine 320. Billing engine 320 may comprise an application, service, server, daemon, routine, or other executable logic for billing a consumer responsive to an order. In some embodiments, billing engine 320 may interface with third-party payment systems, such as credit card providers or banks. In many embodiments, billing engine 320 may further comprise functionality for issuing payments to local providers responsive to orders. In some embodiments, responsive to receiving a commodity or service order from a consumer, billing engine 320 may identify a local provider capable of delivering the commodity or service to the consumer with a lowest unit price out of a plurality of local providers. Such unit prices may be highly volatile, as discussed above. Accordingly, billing engine 320 may retrieve current prices from the plurality of local providers and select a provider with a lowest price for receipt of the order. Thus, a customer may automatically receive the lowest price without effort by the customer. In other embodiments, the customer price may be based off a calculated market price, and the intermediary retailer may select a local provider with a lowest price in order to increase the intermediary retailer's profit margin without increasing customer cost. In some embodiments, as discussed above, billing engine 320 may comprise functionality for placing periodic or automatic orders for a commodity for a consumer, responsive to consumer tank supply thresholds, consumption rates, consumer order history, or environmental factors such as ambient temperature and/or weather.

In some embodiments, server 310 may execute a social network service 322, such as a forum, blog, news feed, or other service, as illustrated in the screenshot of FIG. 4B. In some embodiments, users may earn points by taking actions, such as posting messages or providing indications of approval on the service 322 or otherwise interacting with the service 322. As discussed above, in many embodiments, users may similarly earn points by interacting with external social networking services 324 or third party retailers.

Server 310 may communicate with one or more providers 326. In some embodiments, providers 326 may comprise one or more wholesale providers, and/or one or more local providers. In some embodiments, depending on the type of commodity or service requested, the providers can be remote providers, for example, health or auto insurance providers that may be located elsewhere but are capable of providing health or auto insurance to a consumer. In some embodiments, server 310 may communicate with wholesale providers to identify market wholesale prices for a commodity paid by local providers, such that pricing engine 318 and/or billing engine 320 may identify a market price. In other embodiments, server 310 may communicate with local providers to identify local provider retail prices and bulk discount information, and place orders and provide payments to local providers for delivery of commodities to consumers.

In some embodiments, server 310 may communicate with one or more carbon offset certificate providers 328. Consumers may elect to purchase carbon offset certificates during purchase of commodities to reduce their carbon footprint. This allows a user to automatically offset their purchase, at the time of ordering.

In some embodiments, point earning and purchase history for a consumer may be tracked by the system to customize incentives and offers, reward points based on the tracked data, or perform other functions. For example, in one embodiment using home storage tanks for heating oil, a tank monitor may be placed on the tank. The tank monitor may comprise a level meter and a wired or wireless communication device, which may transmit readings of tank levels to the consumer and/or the intermediary retailer. In one embodiment, the monitor may comprise a tank cap with an integrated monitor and WiFi transceiver for connecting to the consumer's home wireless network and/or desktop or laptop computer. The user may, in some embodiments, use an application to view tank level readings, allowing the user to monitor consumption and manually purchase based on reserve amounts. In other embodiments, the level may be transmitted to the intermediary retailer, for automatic purchase and delivery when the level drops below a user-set threshold. Similarly, in embodiments in which the commodity is natural gas or electricity, a monitor or meter may be installed at the consumer's location, such as a gas meter or electricity meter, that may transmit readings to the consumer's computing device, the provider, and/or the intermediary retailer. In other embodiments, consumption may be monitored based on provider delivery amounts. Thus, the intermediary retailer may monitor a consumer's consumption based on the user's purchase history over a predetermined time. For example, in one embodiment in which the commodity is online movie rentals from service providers such as the iTunes Video Store provided by Apple, Inc. or the Blockbuster online rental service provided by Blockbuster, LLC, the intermediary retailer may monitor the frequency, type, and cost of purchases. In embodiments in which consumption of the commodity is not easily measured, such as internet service or phone service, the intermediary retailer may track usage statistics from the local provider, such as bandwidth or minutes.

In one embodiment, tracked data on a consumer's consumption history or point earning history may be used for marketing purposes or for generating targeted offers. For example, if the intermediary determines that the consumer regularly purchases from a particular third-party retailer, the intermediary may notify the consumer of additional exclusive point earning opportunities through sales at the third-party retailer. These point earning opportunities may be subsidized by the third-party retailer (e.g. the retailer may pay the intermediary a fee for each user taking advantage of the opportunity through purchases from the retailer). In some embodiments, the tracked data may be used for recommendations for conservation measures. For example, if the intermediary notes that the consumer has a higher than average rate of consumption, the intermediary may send conservation tips to the consumer to reduce costs. In other embodiments, tracked data may be used for personalized recommendations for longer term contracts. For example, if the intermediary notes that the consumer repeatedly exceeds a number of minutes on a phone service contract or bandwidth on an internet service contract, the intermediary may send the consumer recommendations for contracts with higher or no caps.

Although the systems and methods described herein may at times be generally described in terms of purchase and/or delivery of a commodity or fuel resource such as oil, these systems and methods may be used to earn and redeem points towards the purchase and/or delivery of any type and form of service, including in home services and local delivery services. These services may include any type of service delivered to the home, such as but not limited to telecommunication services, transportation services, food delivery services, home repair services, home maintenance services and installation services. These services may include any type of service delivered locally to the purchaser or consumer, and not necessarily at the home of the purchaser or consumer, such as car washing services, educational services and dry cleaning services.

These services may include any type of service related to health care, including but not limited to health care insurance, hospital services, doctor services, co-payments for visits to health care provider, chiropractor services, rehabilitation services, physical therapy, prescriptions, etc. As such, in some embodiments, points earned such as by everyday shopping via the systems and methods of the platforms described herein, consumer may earn points and convert them to cash for payment to any health care related service.

These services may include any type of service related to telecommunications, including but not limited to cell phone, smart phone, table or mobile device purchase and related services, including monthly service charges for cellular, wife, data, etc. As such, in some embodiments, points earned such as by everyday shopping via the systems and methods of the platforms described herein, consumers may earn points and convert them to cash for payment to any telecommunication related product and/or service, such as purchase of a new smart phone or mobile device, or upgrading to the same.

Figure 5:
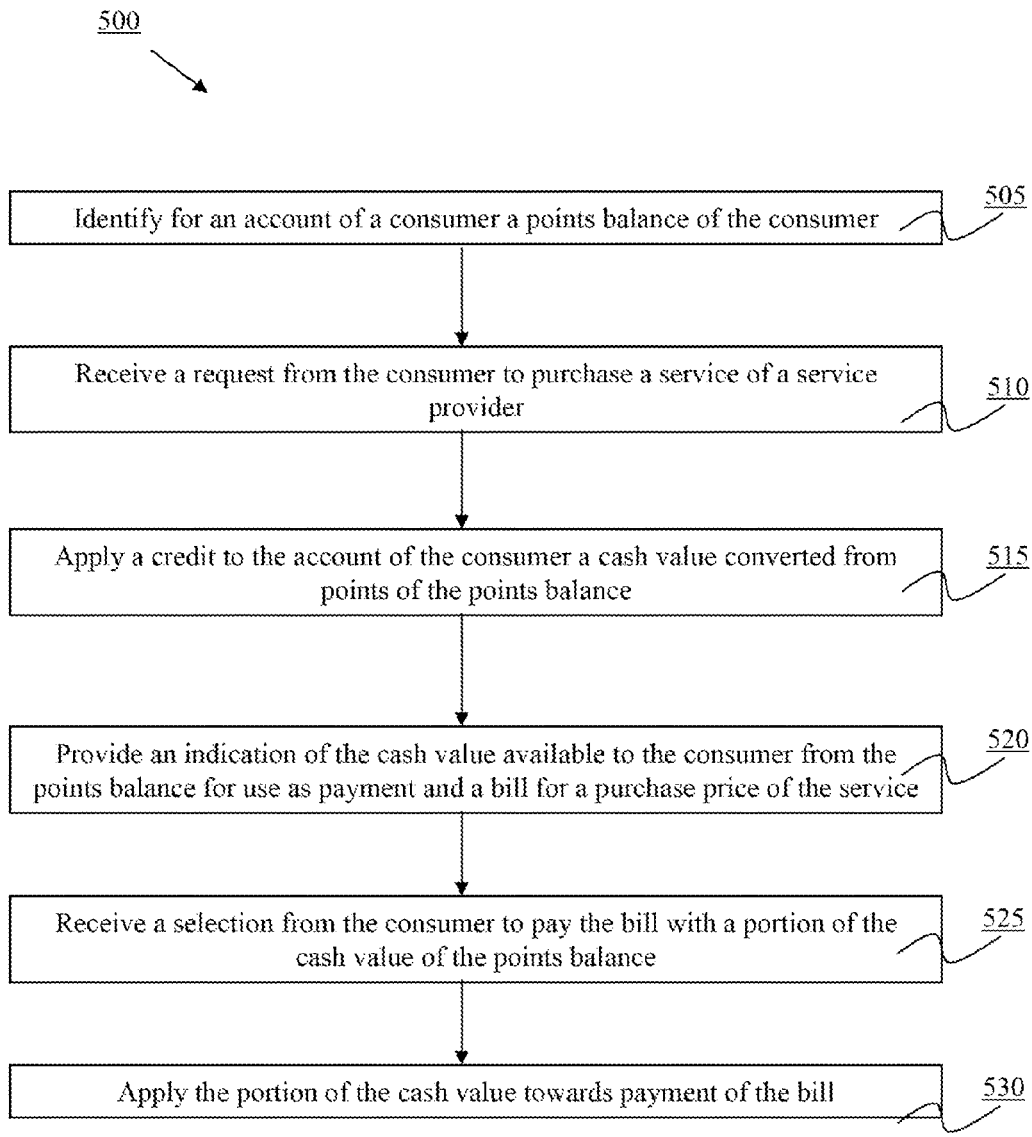
FIG. 5 is a flow diagram of an embodiment of a method for using cash credits earned from consumer activity to pay for a purchase of a service of a service provider.

For example, utilizing the systems and methods of the platform described herein, a telecommunications related retailer or service provide may create a program where they can offer a new "mobile" reward platform to partners (such as telecommunication carriers) so that the partners users may access an instance of the platform for the purpose of converting a portion of everyday spend to credits on their purchase of an upgraded phone and/or minutes. For example, the program may provide the following promotion as an example: "Buy a gallon of milk and earn 10 credits towards the purchase of an iPhone 4 which costs 200 credits." The instance of the platform could be branded as the carrier and the credits would be integrated into the checkout of the carriers website or other means upon to effectuate the process. By enabling such telecommunication retailer and service provide with the ability to offer a reward/incentive program to carriers to drive both higher ticket (e.g. purchase better phones on pre-paid) and also drive loyalty so that with better phones, pre-paid users stay with the carrier longer thereby increasing margin to the carrier FIG. 5 provides a flow diagram of an embodiment of a method for using cash credits earned from consumer activity to pay for a purchase of a service of a service provider. In brief overview, at step 505, a retailer acting as an intermediary between a plurality of consumers and one or more service providers (e.g., intermediary or intermediary retailer) identifies for an account of a consumer of the plurality of consumers maintained by a server a points balance of the consumer. At step 510, the retailer receives a request from the consumer to purchase a service of a service provider of the one or more service providers for which the commodity retailer acts as the intermediary. At step 515, the retailer credits to the account of the consumer a cash value converted from points of the points balance. At step 520, the retailer provides an indication of the cash value available to the consumer from the points balance for use as payment and a bill for a purchase price of the service. At step 525, the retailer receives a selection from the consumer to pay the bill with a portion of the cash value from the points balance. At step 530, the retailer applies the portion of the cash value towards payment of the bill for the purchase price of the service.

In further details of step 505, the retailer, such as a commodity retailer using the systems and methods described herein, identifies for an account of a consumer maintained by the retailer a points balance of the consumer. In some implementations, the retailer maintains accounts for each consumer who has registered with the services of the retailer. The consumer account can include identifying information that identifies the consumer, personal and contact information of the consumer, information associated with one or more accounts, including social networking accounts, of the consumer as well as information associated with actions taken by the consumer external to and tracked by the commodity retailer. In some embodiments, the retailer receives identification of amounts of purchases made by the consumer at one or more third party web-sites not related to the one or more service providers. In some embodiments, the third party web sites can have a relationship (such as contractual or business relationship) with the commodity retailer, for example, the third party web sites can be partners or affiliates. However, the third party web site may have not have a relationship with the service providers that the retailer allows consumers to purchase services using points. For example, the points earned by the consumer are not from purchases with the service providers available via the commodity retailer—that is, the service provider is not providing points for purchases to the consumers to use towards future purchases with that service provider. Instead, the consumer earns points via activity from other providers and retailers not related to the service provider. For example, the consumer may earn points by the commodity retailer for purchases at a grocery store, wholesale club or clothing store and apply those points for cash to pay a bill to a heating oil provider.

In some embodiments, the account also includes a points balance. The points balance indicates a total number of points that are earned by the consumer by taking actions that have yet to be redeemed for a cash benefit. The points balance may identify a history of each of the points earned and how, when and where they were earned.

In some embodiments, the retailer can identify actions taken by the consumer that are recognized by the retailer and systems thereof to earn points. In some embodiments, the retailer can provide points to the consumer for the actions taken by the consumer. In some embodiments, the actions are not related to the one or more service providers. In some embodiments, the actions can be taken external to the retailer. For example, the actions can be taken on a social networking site, at a third party retailer, at a brick and mortar store, at a neighborhood or on an online forum. Examples of actions that can be tracked include online shopping, offline shopping, and social networking activity, such as providing an indication of approval ("like", "+1"), posting a message or a comment, sharing a link, amongst others. Other examples of actions include referring other consumers to the retailer or discussing aspects of the retailer with others. Other examples of actions can be based on how the service is consumed, the amount of consumption of the service or commodity, amongst others. In some embodiments, the retailer can receive activity information via a toolbar or other such program, application or software installation that can track the activity of the consumer online. In some embodiments, the retailer can also receive information from the consumer's social networking accounts and other Internet websites. The retailer can assign points for each activity according to a points policy. In some embodiments, the points policy awards points for the tracked activity according to a points schedule. In some embodiments, the consumer can have a points balance which can be updated to include points earned by the consumer.

At step 510, the retailer receives a request from the consumer to purchase a service of a service provider. The retailer may provide via one or more servers a user interface, such as via serving one or more web pages that displays the services of the multiple services providers for which the retailer sells services. The retailer may provide a user interface that displays the different type of services available via the retailer. The retailer may provide a user interface that displays the different service providers available via the retailer. The retailer may provide a user interface that displays the different service providers for each of the different services available via the retailer. The retailer may provide a user interface that display the pricing per service and/or service provider.

Via the user interface of the server of the retailer, a consumer may browse, view and select one or more services to purchase and submit a request to purchase. The request may be provided via a shopping cart or checkout. Via the user interface of the server of the retailer, a user may add one or more services to a shopping cart. The user may select one or more services and initiate a checkout process via the retailer. In some embodiments, the request is to purchase a service of a service provider for which the retailer acts as the intermediary to process payments from the consumer for purchases of the service of the service provider. In some embodiments, the request can include request(s) to purchase one or more services from one or more service providers. In some embodiments, the request identifies a service without identifying a particular service provider. In some embodiments, the request includes additional details related to the service, including a quantity, a delivery date and time, amongst others.

At step 515, the retailer credits a cash value converted from points of the points balance to the account of the consumer. The retailer may credit the cash value responsive to a consumer's request, such as upon receiving a request to purchase a service. The retailer may credit the cash value automatically on a predetermined schedule or every time the consumer visits the consumer's account. In some embodiments, the points can be converted to a cash value. In some embodiments, the consumer selects an amount of points from the points balance to convert or redeem to a cash value or credit.

The retailer can convert points according to a points conversion schedule. For example, the points can be converted to a cash value that can be applied towards payment of a bill for a service provided by one of the service providers for which the retailer acts as an intermediary. In some embodiments, the retailer identifies a number of points in the points balance and multiplies the number of points by a points-to-cash conversion rate to generate the cash value. The points to cash conversion schedule may be specified at any granularity, such as on a per service basis, on a per service provider basis, a per consumer basis and/or a on per point redeeming activity (e.g., per third party web-site or per type of action taken). The retailer designated, adds or identifies the cash value to the account of the consumer and remove the points used to generate the cash value from the points balance. In some embodiments, the cash value or cash credit is only redeemable for payments towards services available via the retailer.

At step 520, the retailer provides an indication of the cash value available to the consumer from the points balance for use as payment and a bill for a purchase price of the service. In some embodiments, the retailer provides the indication of the cash value in response to receiving a request to purchase a service from the consumer. In some embodiments, upon receiving the request to purchase a service from the consumer, the retailer can generate a bill for the service. In some embodiments, the retailer can generate a bill for the service in which the service is priced lower than a price the consumer would have paid had the consumer purchased the service directly from the service provider. In some embodiments, the retailer receives service prices from a plurality of service providers. In some embodiments, the retailer receives service prices from a plurality of service providers responsive to providing the service providers information about the request to purchase a service that is received from the consumer. Examples of the information can include consumer information, a delivery address, a quantity, a delivery time and date, amongst others. In some embodiments, the retailer can generate a bill for the service in which the service price is a predetermined amount, such as an amount greater than a price at which the service provider has agreed to provide the service to the retailer's customers. For example, the predetermined amount can be a percentage, such as 10% for example, or a fixed amount per unit of service, such as $2/unit. The retailer can determine the cash value available to the consumer from the points balance according to the points conversion schedule. In some embodiments, the retailer may retrieve current prices from the plurality of service providers and select a provider with a lowest price for receipt of the order. In this way, a consumer may automatically receive the lowest price without effort by the consumer. In other embodiments, the consumer price may be based off a calculated market price, and the retailer may select a local provider with a lowest price in order to increase the intermediary retailer's profit margin without increasing customer cost.

At step 525, the retailer receives a selection from the consumer to pay the bill with a portion of the cash value from the points balance. In some embodiments, the retailer receives the selection from the consumer in response to providing an indication of the cash value available to the consumer from the points balance for use as payment and a bill for a purchase price of the service. In some embodiments, the consumer selects pays the entire bill with cash value from the points. In some embodiments, the consumer selects and uses all of the available cash value towards payment. In some embodiments, the consumer selects a portion of the available cash value and use that portion towards payment.

At step 530, the retailer applies the portion of the cash value towards payment of the bill for the purchase price of the service. In some embodiments, the retailer then provides an updated amount to be paid corresponding to a difference between an amount of the bill and the portion of the cash value applied towards the bill. In some embodiments, if the selected cash value available is not enough to pay the bill for the service, the consumer pays any remainder via other means, such as credit card, cash, invoice, bill, etc. With the combination of cash value and other form of payment, the retailer pays for the service on behalf of the consumer. In some embodiments, the cash value is sufficient to cover the payment of service and the retailer pays for the service on behalf of the consumer. Via the systems of the retailer that interface to any one or more service providers, the retailer may electronically submit payment to the service provider. Via the systems of the retailer that interface or communicate to any one or more service providers, the retailer may electronically make the transaction for purchase of the service with the service provider, including making payment to the service provider.

In some embodiments, upon the bill being paid in full, the retailer notifies the consumer that the request to purchase the service is successful. In some embodiments, the retailer can then notify a service provider to provide the service to the consumer. In some embodiments, the retailer may then reveal the identity of the service provider that is providing the service, to the consumer.

C. Systems and Methods for Generating a Bill for an Account of a Provider Based on Bill Reduction Credits Referring now to FIG. 6, a networked environment for applying bill reduction credits to a bill generated by a bill processor for a provider of goods or services is shown. A rewards points system 602 can serve as an intermediary between a plurality of consumers 612A-612N (hereinafter consumers 612). and a plurality of participating entities 614A-614N (hereinafter participating entities 614). One or more networks 604 can be configured to enable communications between one or more of the consumers, participating entities, rewards points system 602, the provider 610 and the bill processor 620. The participating entities can be businesses, stores, restaurants, retail entities, or any other entity through which a consumer can earn rewards points. The consumers 612 can be members of the rewards points system 602 and earn rewards points via transactions at one or more of the participating entities. In addition, the consumers 612 may earn rewards points via activities performed on social networking sites, marketing efforts, or other activities that may directly or indirectly influence or affect transactions at one or more of the participating entities or the rewards points system 602. As described above with respect to FIGS. 1B and 3, the rewards points system 602 can be similar to the commodity retailer 106 and the server 310 of the commodity retailer 106 may perform functions similar to a server of the rewards points system 602.

The consumers 612 can also be consumers of goods or services provided by one or more providers, such as the provider 610. The provider 610 can provide goods or services, for example, a cellular service provider, a utility provider. The provider 610 can provide goods or services that are billed on a recurring basis. In some implementations, the provider 610 can provide goods or services that are billed at a per usage basis. In some implementations, the provider can provide fungible goods, commodities, perishable goods, among others. The consumers 612 can communicate with the provider 610 via the one or more networks.

The bill processor 620 that includes a server that can communicate with both the rewards points system 602 and one or more providers 610. The bill processor 620, as will be described in further detail, can process bills for the providers 610. In some implementations, the bill processor 620 can receive charge data from the provider 610 and bill reduction credit data from the rewards points system 602 and generate bills for the plurality of consumers 612 based on the charge data from the provider 610 and the bill reduction credit data from the rewards points system 602. The bill reduction credit data can identify, for a particular consumer, an amount by which to reduce a bill of a provider. The amount by which to reduce the bill can be based on a number of points the consumer has earned and accumulated in the rewards points system 602. Additional details relating to the generation of bills and the application of bill reduction credit data are provided herein.

Figure 6:
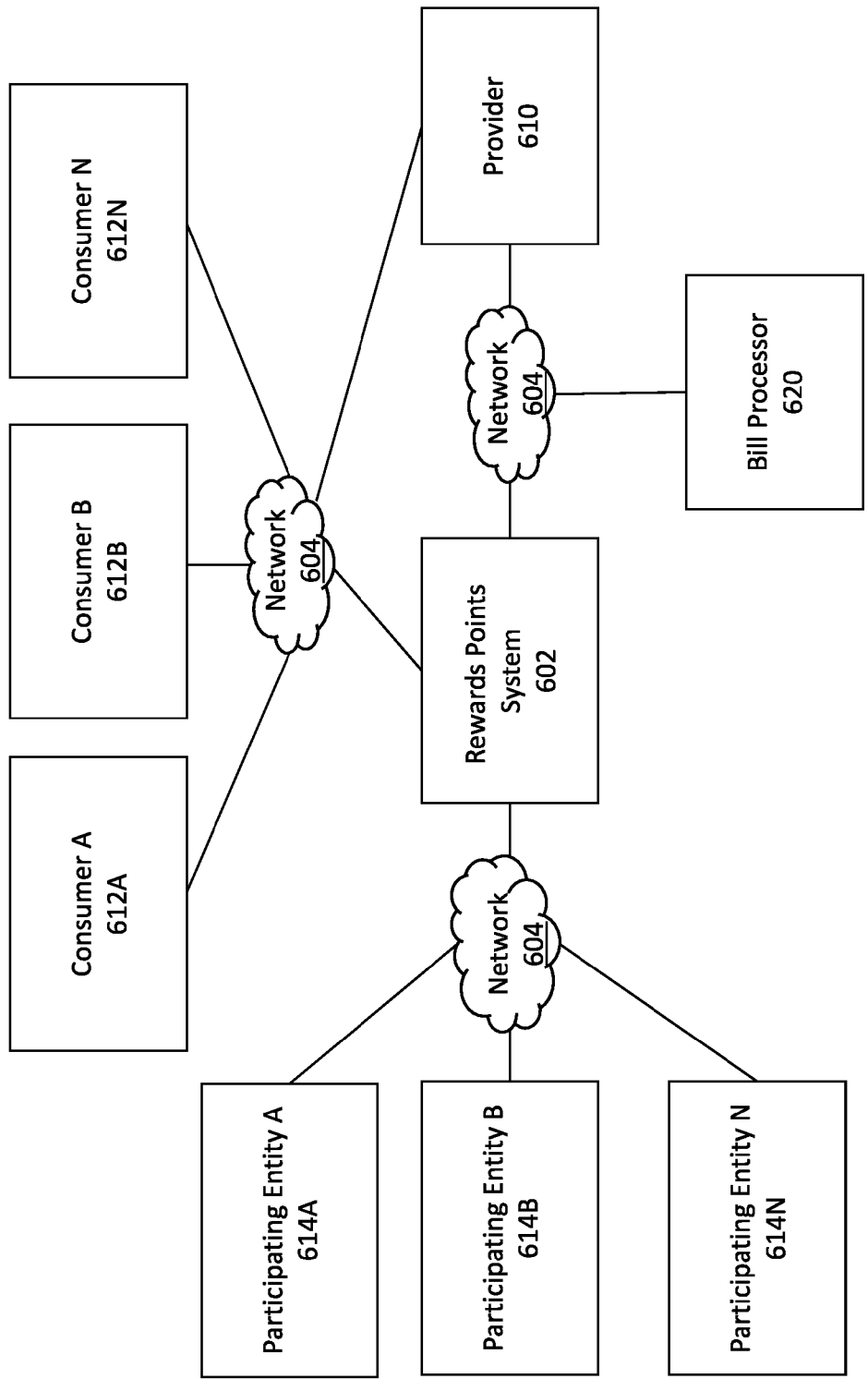
FIG. 6 is a diagrammatic view of a market that includes a provider of goods or services, a point rewards system, and a third-party bill processor.
Figure 7:
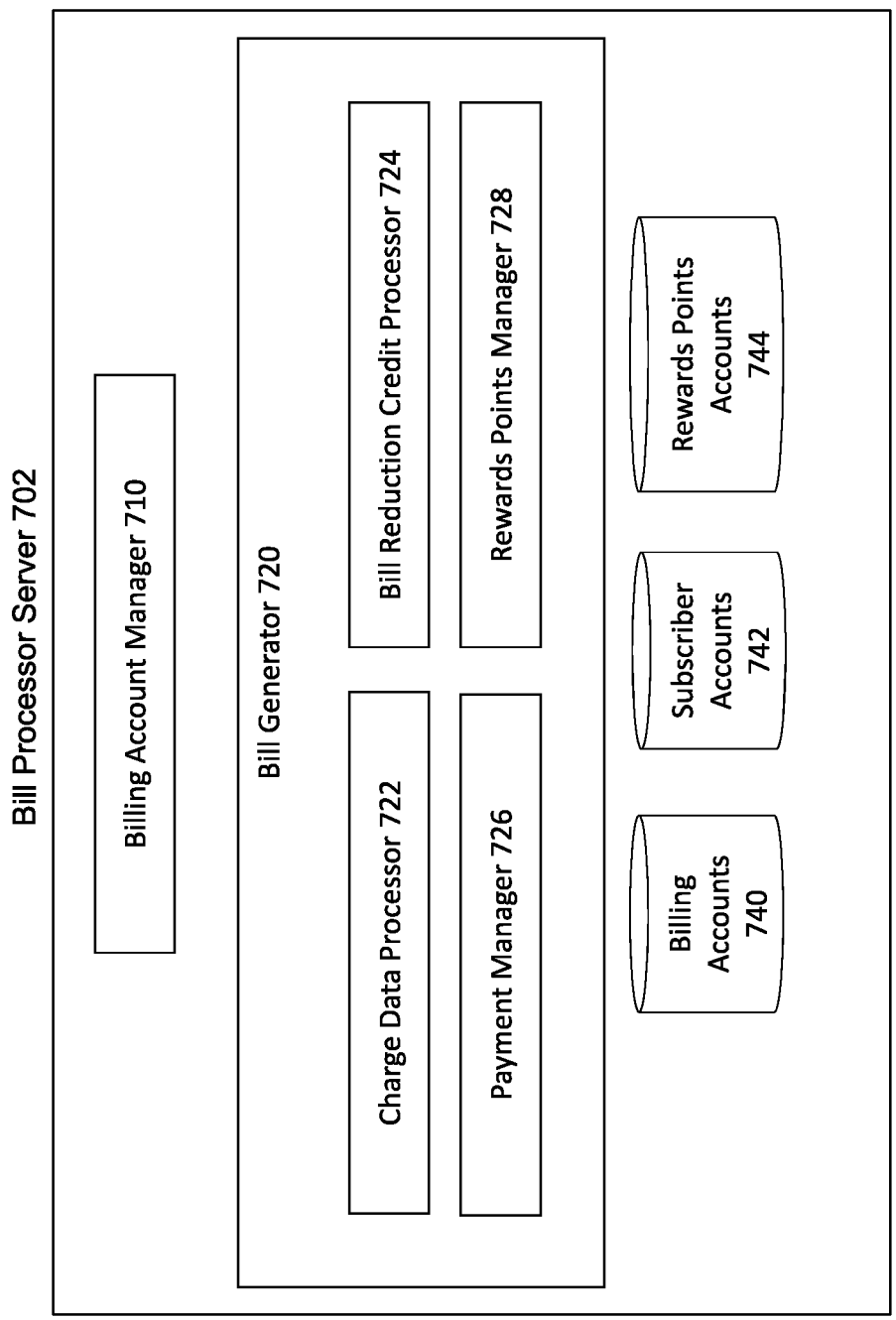
FIG. 7 is a block diagram of an embodiment of a server of a bill processor intermediary to the point rewards system and the provider of goods or services shown in FIG. 6.

FIG. 7 show a block diagram of an embodiment of a server of a bill processor intermediary to the point rewards system and the provider of goods or services shown in FIG. 6 is shown. The server 702 of the bill processor 620 may comprise, in some embodiments, a billing account manager 702 and a bill generator 720. The bill generator 720 can include a charge data processor 722, a bill reduction credit processor 724, a payment manager 726 and a points manager 728. The server can also include, store, maintain or access a billing accounts database 740, a subscriber accounts database 742 and a rewards points database 744. Although illustrated as a single server 702, in many embodiments, one or more modules or components of the server 702 may be executed by separate servers, by a server farm, by virtual machines hosted in a cloud service, or via other similar means.

Still referring to FIG. 7 and in more detail, in some embodiments, the billing account manager 702 may comprise an application, service, server, daemon, or other executable logic for managing and maintaining billing accounts. The billing account manager 702 can generate a billing account for each subscriber of one or more providers for which the bill processor processes bills. The billing account manager 702 can maintain the billing account for each subscriber including updating the billing account based on charge data received from the provider 610 or bill reduction credit data received from the rewards points system 602. In some implementations, the billing account manager 702 can manage, maintain, access and update the billing accounts database 740. The billing accounts database 740 includes records, entries, or other entity or structure that includes details relating to billing accounts of subscribers of the providers for which the server 702 of the bill processor 620 processes bills. A billing account can include a billing account identifier and details identifying, for each subscriber account, charges assessed by the provider. The charges can include detailed reports or line item details regarding the charges. In addition, the billing account can receive bill reduction credit data including one or more amounts of bill reduction credit to be applied to the charges of the provider. In some implementations, the billing account can be linked to a single subscriber and a single rewards points account of the rewards points system. The billing account can also include payment history of the subscriber or other payment information received from the provider.

In some implementations, the billing account manager 702 can identify a subscriber account from charge data received from a provider or from the rewards points system 602. The billing account manager 702 can then perform a lookup in the billing accounts database 740 to identify an entry in the database 740 that corresponds to the subscriber account. In some implementations, the billing account manager 702 may use a subscriber account identifier to perform the lookup. If no entry in the database identified the subscriber account identifier, the billing account manager 702 can create or generate a billing account for the subscriber account identifier. The billing account manager 702 can include an entry in the subscriber accounts database 742 corresponding to the subscriber account identifier. The billing account manager 702 can then link the billing account with the subscriber account and update both the billing account and the subscriber account with information pertaining to the subscriber of the subscriber account.

In some implementations, the billing account manager 702 can identify a rewards points account from data received from the rewards points system 602. The billing account manager 702 can perform a lookup in the rewards points accounts database 744 to identify an entry in the database 740 that corresponds to the rewards points account. If the billing account manager 702 is unable to locate the rewards points account, the billing account manager 702 can create or generate an entry corresponding to the rewards points account in the rewards points account database 744. In some implementations, the billing account manager 702 can further perform a lookup in the billing accounts database 740 to identify a billing accounts entry that corresponds to a subscriber account that corresponds to the rewards points account and update the billing accounts entry of the billing account identifier to include a link or association to the rewards points identifier.

The bill generator 720 may comprise an application, service, server, daemon, or other executable logic for generating bills. The bill generator can include the charge data processor 722, the bill reduction credit processor 724, the payment manager 726 and a points manager 728, each of which may comprise an application, service, server, daemon, or other executable logic to perform one or more functions.

The charge data processor 722 can be configured to receive charge data from one or more servers of providers of services or goods for which the bill processor generates bills. The charge data processor can receive, via a connection established between the server 702 of the bill processor 620 and a server of the provider, network packets that include charge data. In some implementations, the server of the provider 610 can establish a connection with the server of the bill processor 620 or vice versa. The server of the provider 610 can communicate with the bill processor via one or more APIs that enable the server of the provider to transmit the charge data to the server 702 of the bill processor 620.

Charge data includes information relating to charges incurred by or assessed to an account of a subscriber, consumer or customer of the provider. As such, the charge data can include an account identifier of the account of the subscriber of the provider. The charge data received by the server 702 can include charge data for a plurality of accounts of subscribers of the provider. In some implementations, the charge data received by the server 702 can include charge data for a single account of a subscriber of the provider. In some implementations, the server 702 can receive the charge data periodically, for example, once a day, one a week, one a month, among others. In some implementations, the server 702 can receive the charge data on a per use basis such that each time the subscriber receives services or goods for which the subscriber has generated a charge, the server 702 receives network packets including the charge data corresponding to the generated charge. In some implementations, the charge data can include charge related data for a subset of the subscribers. In some implementations, the server of the provider can identify a subset of the subscribers for which to transmit charge data based on a recurring date, for example, each of the subset of subscribers have a monthly billing date on the same day, for instance, the 5$^{th}$ of each month.

The charge data processor 722 can be configured to manage, maintain, access or update the subscriber accounts database 742. The subscriber accounts database 742 can include a plurality of entries. Each entry can correspond to a particular account of a subscriber of the provider. Each entry can identify an account identifier identifying the account, one or more charges assessed to the account, additional details received from the server of the provider 610 regarding the charges, among others. The details can include charge related information that may be included in bills generated by the bill processor. For instance, if the provider is a cellular service provider, the details of the charges can include times and dates of when phone calls were placed or received, the length of such calls, the outgoing number or incoming number of the calls, among others. In addition, the details of the charges can include data consumption, including an amount of consumption, the dates and times of consumption, among others.

The bill reduction credit processor 724 of the bill processor 620 can be configured to receive bill reduction credit data from the rewards points system 602. In some implementations, the bill reduction credit processor 724 can establish a connection with the rewards points system 602. The bill reduction credit processor 724 can establish the connection with the rewards points system 602 via one or more networks. In some implementations, the rewards points system 602 can communicate with the bill reduction credit processor 724 via one or more APIs that enable the rewards points system 602 to transmit bill reduction credit data to the bill reduction credit processor 724. The bill reduction credit data can include a plurality of entries. Each entry can identify a respective subscriber account of a plurality of subscriber accounts of the provider corresponding to the rewards account, and a bill reduction credit amount by which to reduce the bill to be generated by the bill processor for the respective subscriber account The rewards points system 602 can transmit the bill reduction credit data via one or more network packets. The network packets carrying the bill reduction credit data can include additional information that can be used by the bill reduction credit processor 724 or the server 702 of the bill processor 620 to apply bill reduction credits to bills generated by the bill generator 720 for one or more accounts of subscribers of the providers 610 for which the bill processor 620 generates bills.

In some implementations, the rewards points system 602 can transmit the bill reduction credit data in a file that includes bill reduction credits for multiple accounts of subscribers. The rewards points system can determine the bill reduction credit based on a number of points included in rewards points accounts of members of the rewards points system. In some implementations, the rewards points system can include one or more policies that include sets of rules according to which points can be converted to bill reduction credits. Details regarding the rewards points system are described above with respect to the commodity retailer shown in FIGS. 3-5.

In some implementations, The rewards points system 602 can transmit the bill reduction credit data in a batch file that includes a batch header, a file header, a detail record, a file trailer and a batch trailer. The batch header can include a first string of bits, the first string of bits including one or more bits corresponding to different values. For example, in one implementation, the first string can include one or more bits for a record type, one or more bits identifying a receipt date on which a payment is received, one or more bits identifying a reference number, one or more bits identifying the current Julian day, one or more bits identifying a provider identifier that identifies the provider to whose bills to apply the bill reduction credit, one or more bits identifying a batch number, one or more bits identifying a record sequence number, one or more bits identifying a record identifier, among others.

The file header can also include a second string of bits including one or more bits corresponding to different values. For example, in one implementation, the second string can include one or more bits for a record type, one or more bits identifying the current Julian day, one or more bits identifying a transmission date on which the file was transmitted, one or more bits identifying a name of the rewards points system, among others.

The detail record can also include a third string of bits including one or more bits corresponding to different values. For example, in one implementation, the third string can include one or more bits for a record type, one or more bits identifying a customer account number identifying an account of a customer, one or more bits identifying a receipt date, one or more bits identifying a transaction type, one or more bits identifying a company code, one or more bits identifying a payment amount, one or more bits identifying a reference number that can include a current Julian day, a provider identifier, a batch number, a record sequence number, a record identifier, among others.

The file trailer can also include a fourth string of bits including one or more bits corresponding to different values. For example, in one implementation, the fourth string can include one or more bits for a record type identifying the file trailer, one or more bits identifying a control number, which may be the current Julian day, one or more bits identifying a transmission date on which the file was transmitted, one or more bits identifying a total amount of all batches, and one or more bits identifying a total record count, including file and batch headers, among others.

The batch trailer can also include a fifth string of bits including one or more bits corresponding to different values. For example, in one implementation, the fifth string can include one or more bits for a record type, one or more bits identifying a processing date, one or more bits identifying a transaction type, one or more bits identifying a company code, one or more bits identifying a payment amount, one or more bits identifying a reference number, which may include a current Julian day, a provider identifier, a batch number, a record sequence number, a record identifier, a number of detail records, among others.

The bill reduction credit processor 724 can be configured to receive the bill reduction credit data as a file and parse the file to extract the bill reduction credit data included in the file. The bill reduction credit processor 724 can identify, for each subscriber account, a bill reduction credit amount by which to reduce the bill to be generated by the bill processor for the respective subscriber account. The bill reduction credit processor 724 can identify, using the subscriber account information included in the bill reduction credit data, the bill reduction credit amount. The bill reduction credit processor 724 can also identify, from the bill reduction credit data, a corresponding rewards points account identifier identifying the rewards points account associated with the subscriber account.

The rewards points system 602 can be configured to allow a consumer or member of the rewards points system to identify one or more accounts of providers to link or otherwise associate with the rewards points account of the consumer. In some implementations, the rewards points system 602 can provide a user interface through which the consumer can identify a provider of goods or services with which the consumer has an account. The consumer can then, via a client device on which the user interface of the rewards points system is presented, identify a subscriber account of the provider that the consumer chooses to link or otherwise associate with the rewards points account. In some implementations, the consumer may identify the subscriber account of the provider by signing into the subscriber account of the provider via a portal provided by the rewards points system. In some implementations, the consumer may provide, via a client device of the consumer, an account identifier of the subscriber account to the rewards points system.

The bill generator 720 can be configured to identify, for each billing account of the bill processor, a corresponding subscriber account and charge data corresponding to the subscriber account and a respective bill reduction credit amount of the rewards account corresponding to the subscriber account. As described herein, a billing account of the bill processor 620 can be linked or otherwise associated with a respective subscriber account of the provider 610 and a rewards points account of the rewards points system 602.

The bill generator 720 of the bill processor can then generate, for one or more subscriber accounts of a provider, a bill that identifies charges for the subscriber account, a bill reduction credit amount corresponding to the subscriber account based on the bill reduction credit data received from the rewards points system 602, and an amount payable based on a difference between the charges for the account and the bill reduction credit amount. The bill generator 720 can generate the bill of a subscriber account responsive to receiving a request from the provider. In some implementations, the bill generator 720 can execute one or more instructions to generate bills for a plurality of subscriber accounts in accordance with a bill generation policy. In some implementations, the bill generation policy can cause the bill generator 720 to generate the bill of a subscriber account according to a fixed schedule provided by the provider. The schedule may be based on a billing frequency of the provider. In some implementations, the provider can send a batch request to the bill generator identifying a list of subscriber accounts for which to generate bills.

In some implementations, the bill generator 720 can receive the charge data from the provider. In some implementations, the bill generator 720 can access the charge data via an API into the provider. The bill generator 720 can further receive bill reduction credit data from the rewards points system 602.

The bill generator may access, for a given billing account identifier, charge data of a subscriber account that is stored in the subscriber accounts database 742. The bill generator may perform a lookup using the billing account identifier or the subscriber account identifier to identify charges to be billed by the bill generator. In some implementations, the charge data can include a list of charges and an amount to charge for each of the charges.

The bill generator may access, for the given billing account identifier, the bill reduction credit data identifying an amount by which to reduce the bill to be generated by the bill generator 720. The bill generator 720 may perform a lookup in the rewards points database 744 using the billing account identifier or a rewards points identifier corresponding to the billing account identifier to identify the amount by which to reduce the bill.

The bill generator 720 can then generate the bill corresponding to the billing account identifier. The bill generator 720 can deduct the amount by which to reduce the bill from the amount to charge for services or goods provided by the provider. The bill generator 720 can then identify any additional unpaid balances and add those to the total. In some implementations, the bill generator 720 may also add additional charges, fees, taxes, among others to the bill. The bill generator can then generate the bill including the total amount to charge as well as additional data that a subscriber of the provider can view to understand the bill.

The payment manager 726 can be configured to manage payment data. In some implementations, the payment manager 726 can receive information from the provider regarding payments received by the provider for bills previously sent to subscribers. In some implementations, the payment manager 726 can receive payment data corresponding to payments applied to a subscriber account and cause the bill generator to insert the payment amount included in the payment data in a bill generated for the subscriber account. In addition, the payment manager 726 can update an entry in the billing accounts database and the subscriber accounts database corresponding to the billing account identifier and the subscriber account identifier, respectively, to reflect the payment applied to the subscriber account. In some implementations, the server 702 of the bill processor 620 may receive payment data regarding the payments made by one or more subscribers from the provider. The payment data may be transmitted as a file. In some implementations, the payment data may be transmitted in one or more network packets that identify the subscriber account, an invoice number associated with the bill, a date of payment, a method of payment, and the amount of payment. The payment data can then be stored in entries of the billing accounts database 740 and/or the subscriber accounts database 742.

The points manager 728 can be configured to maintain rewards points account database 744. The points manager 728 can receive, from the rewards points system 602, rewards points related data for one or more members of the rewards points system 602. The rewards points related data can include bill reduction credit data identifying an amount by which to reduce a bill for a plurality of subscriber accounts. The rewards points related data can be configured to update a rewards points account of a rewards points account identifier in response to the bill generator applying a bill reduction credit amount to a subscriber account that is linked or otherwise corresponds to the rewards points account identifier. In response to the bill reduction credit amount being applied, the points manager 728 can update the rewards point account entry in the rewards points accounts database 744 that is identified by the rewards point account identifier. The update can indicate that the bill reduction credit has been applied. Further, the points manager 728 can generate and transmit, via one or more network packets, a notification, message or data indicating to the rewards points system, that the bill generator 720 has applied the bill reduction credit to the subscriber account. In this way, the rewards points system 602 can update the rewards points balance of the rewards points account maintained by the rewards points system 602 by deducting the number of points corresponding to the bill reduction credit amount by which the bill was reduced.

The points manager 728 can cause the bill processor server 702 to establish a connection with the rewards points system 602 to transmit data to update the rewards points balance of the rewards points account maintained by the rewards points system 602. In some implementations, the points manager 728 may generate a file to transmit to the rewards points system 602. The file can include a plurality of entries, each entry can identifying a rewards points account identifier and the amount of bill reduction credit applied to the bill. In some implementations, the file can identify a number of rewards points converted to bill reduction credit. In some implementations, the file can be generated and transmitted responsive to the bill generator 720 generating the bills. In some implementations, the file can be generated and transmitted at a predetermined time. In some implementations, the file can be generated and transmitted at predetermined time intervals.

Figure 8:
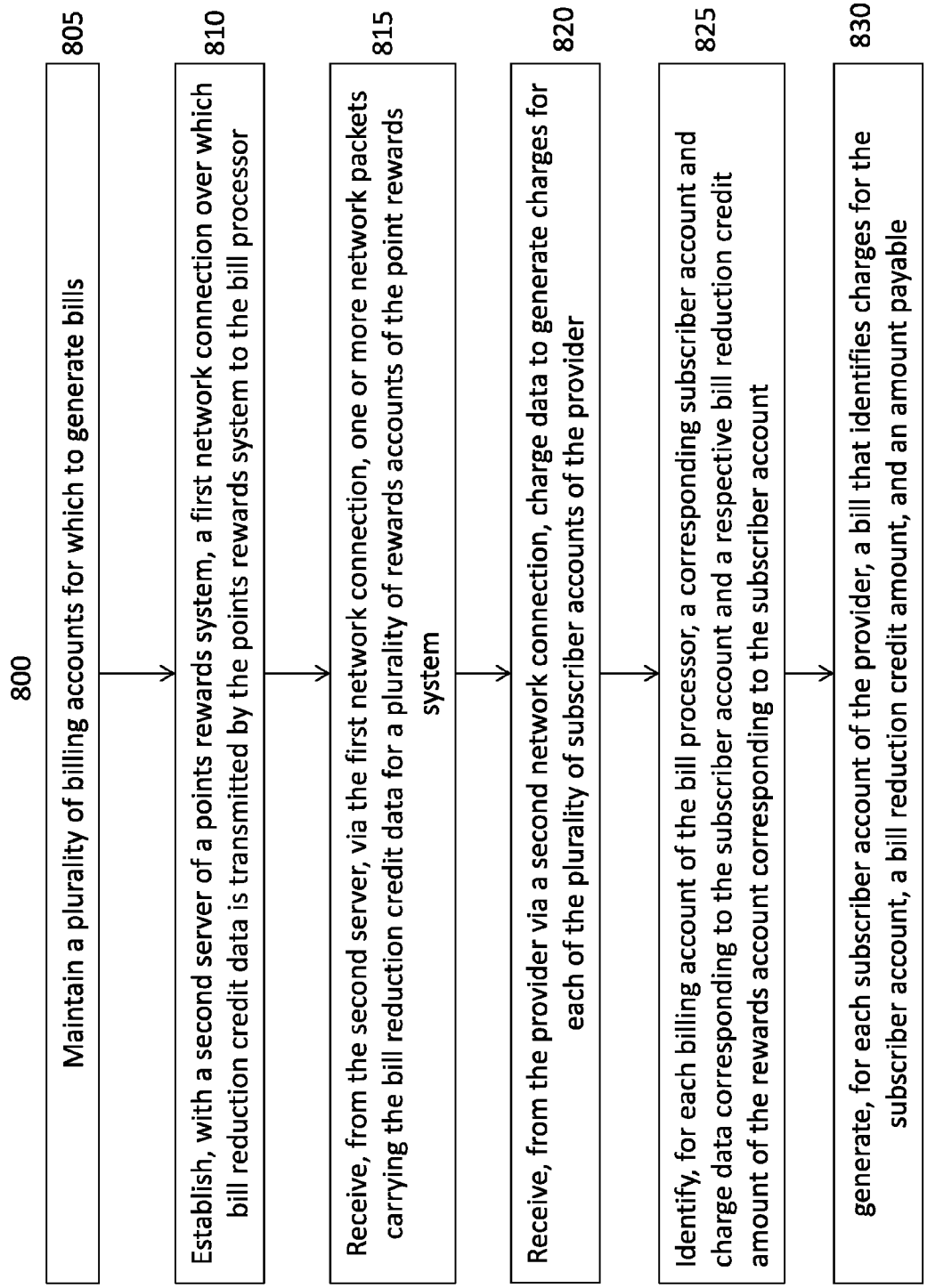
FIG. 8 is a flow diagram of an embodiment of a method of generating a bill for an account of a provider based on bill reduction credits.

FIG. 8 is a flow diagram of an embodiment of a method of generating a bill for an account of a provider based on bill reduction credits. In brief overview, a method of generating a bill for an account of a provider based on bill reduction credits is described. A server of a bill processor maintains a plurality of billing accounts for which to generate bills (step 805). The server establishes, with a second server of a rewards points system, a first network connection over which bill reduction credit data is transmitted by the rewards points system to the bill processor (step 810). The server receives, from the second server, via the first network connection, one or more network packets carrying the bill reduction credit data for a plurality of rewards accounts of the point rewards system (step 815). The server receives, from the provider via a second network connection, charge data to generate charges for each of the plurality of subscriber accounts of the provider (step 820). The server identifies, for each billing account of the bill processor, a corresponding subscriber account and charge data corresponding to the subscriber account and a respective bill reduction credit amount of the rewards account corresponding to the subscriber account (step 825). The bill processor generates, for each subscriber account of the provider, a bill that identifies charges for the subscriber account, a bill reduction credit amount corresponding to the subscriber account, and an amount payable based on a difference between the charges for the account and the bill reduction credit amount (step 830).

In further detail, the server of the bill processor maintains a plurality of billing accounts for which to generate bills (step 805). Each billing account is specific to a subscriber account of a provider of goods or services. The server can generate a billing account for each subscriber of one or more providers for which the bill processor processes bills. The server can maintain the billing account for each subscriber including updating the billing account based on charge data received from the provider or bill reduction credit data received from the rewards points system. In some implementations, the server can manage, maintain, access and update a billing accounts database. The billing accounts database includes records, entries, or other entity or structure that includes details relating to billing accounts of subscribers of the providers for which the server processes bills. A billing account can include a billing account identifier and details identifying, for each subscriber account, charges assessed by the provider. The charges can include detailed reports or line item details regarding the charges. In addition, the billing account can receive bill reduction credit data including one or more amounts of bill reduction credit to be applied to the charges of the provider. In some implementations, the billing account can be linked to a single subscriber account and a single rewards points account of the rewards points system. The billing account can also include payment history of the subscriber or other payment information received from the provider.

The server establishes, with a second server of a rewards points system, a first network connection over which bill reduction credit data is transmitted by the rewards points system to the bill processor (step 810). The server can receive bill reduction credit data from the rewards points system. In some implementations, the server can establish a connection with the rewards points system. The server can establish the connection with the rewards points system via one or more networks. In some implementations, the rewards points system can communicate with the server via one or more APIs that enable the rewards points system to transmit bill reduction credit data to the server. The bill reduction credit data can include a plurality of entries. Each entry can identify a respective subscriber account of a plurality of subscriber accounts of the provider corresponding to the rewards account, and a bill reduction credit amount by which to reduce the bill to be generated by the bill processor for the respective subscriber account The server receives, from the second server, via the first network connection, one or more network packets carrying the bill reduction credit data for a plurality of rewards accounts of the point rewards system (step 815). The bill reduction credit data can include a plurality of entries. Each entry identifies a respective subscriber account of a plurality of subscriber accounts of the provider corresponding to the rewards account and a bill reduction credit amount by which to reduce the bill to be generated by the bill processor for the respective subscriber account. The rewards points system can transmit the bill reduction credit data via one or more network packets. The network packets carrying the bill reduction credit data can include additional information that can be used by the server to apply bill reduction credits to bills generated by the server for one or more accounts of subscribers of the providers for which the bill processor generates bills.

In some implementations, the rewards points system can transmit the bill reduction credit data in a file that includes bill reduction credits for multiple accounts of subscribers. The rewards points system can determine the bill reduction credit based on a number of points included in rewards points accounts of members of the rewards points system. In some implementations, the rewards points system can include one or more policies that include sets of rules according to which points can be converted to bill reduction credits.

In some implementations, the bill reduction credit data further includes a point rewards system account identifier corresponding to the respective subscriber account. In some implementations, the bill reduction credit data is based on rewards points earned based on transactions at participating entities, the rewards points system maintaining the plurality of rewards accounts for a plurality of users of the rewards points system.

In some implementations, receiving one or more network packets carrying the bill reduction credit data includes receiving a file including a batch header, a file header, a detail record, a file trailer and a batch trailer. In some such implementations, each of the batch header, a file header, a file trailer and a batch trailer include a predetermined number of bits corresponding to a plurality of fields.

The server receives, from the provider via a second network connection, charge data to generate charges for each of the plurality of subscriber accounts of the provider (step 820). In some implementations, charge data includes a plurality of entries, each entry identifying a respective subscriber account of the provider and information to generate charges for the respective subscriber account. In some implementations, the server can receive the charge data from the provider. In some implementations, the server can access the charge data via an API into the provider. The bill processor may access, for a given billing account identifier, charge data of a subscriber account that is stored in the subscriber accounts database.

The bill processor may perform a lookup using the billing account identifier or the subscriber account identifier to identify charges to be billed by the bill processor. In some implementations, the charge data can include a list of charges and an amount to charge for each of the charges.

The server identifies, for each billing account of the bill processor, a corresponding subscriber account and charge data corresponding to the subscriber account and a respective bill reduction credit amount of the rewards account corresponding to the subscriber account (step 825). As described herein, a billing account of the bill processor can be linked or otherwise associated with a respective subscriber account of the provider and a rewards points account of the rewards points system. The bill processor may perform a lookup using the billing account identifier or the subscriber account identifier to identify charges to be billed by the bill processor. In some implementations, the charge data can include a list of charges and an amount to charge for each of the charges.

The server generates, for each subscriber account of the provider, a bill that identifies charges for the subscriber account, a bill reduction credit amount corresponding to the subscriber account, and an amount payable based on a difference between the charges for the account and the bill reduction credit amount (step 830). The server can generate the bill of a subscriber account responsive to receiving a request from the provider. In some implementations, the server can execute one or more instructions to generate bills for a plurality of subscriber accounts in accordance with a bill generation policy. In some implementations, the bill generation policy can cause the server to generate the bill of a subscriber account according to a fixed schedule provided by the provider. The schedule may be based on a billing frequency of the provider. In some implementations, the provider can send a batch request to the bill processor identifying a list of subscriber accounts for which to generate bills.

FIG. 9 is a flow diagram of an embodiment of a method generating a bill for an account of a provider based on bill reduction credits. A server of a rewards points system maintains a plurality of rewards points accounts corresponding to members that earn points based on transactions at participating entities (step 905). The server establishes with a second server of a bill processor, a first network connection over which bill reduction credit data is transmitted by the rewards points system to the bill processor (step 910). The server transmits to the second server, via the first network connection, one or more network packets carrying the bill reduction credit data for a plurality of rewards accounts of the point rewards system (step 915). The server, in response to the second server generating bills for a plurality of subscriber accounts of the provider based on the bill reduction credit data received from the first server, receives a notification that the bill reduction credit amounts have been applied to the bills generated for the respective subscriber accounts (step 920). The first server, in response to the first server receiving the notification, updates the rewards accounts of members based on the respective bill reduction credit amount applied to the corresponding subscriber accounts (step 925).

In further detail, the server of the rewards points system maintains a plurality of rewards points accounts corresponding to members that earn points based on transactions at participating entities (step 905). The participating entities can be businesses, stores, restaurants, retail entities, or any other entity through which a consumer can earn rewards points. The members of the rewards points system can earn rewards points via transactions at one or more of the participating entities. In addition, the members may earn rewards points via activities performed on social networking sites, marketing efforts, or other activities that may directly or indirectly influence or affect transactions at one or more of the participating entities or the rewards points system. As described above with respect to FIGS. 1B and 3, the rewards points system can be similar to the commodity retailer 106 and the server 310 of the commodity retailer 106 may perform functions similar to a server of the rewards points system 602.

The server establishes with a second server of a bill processor, a first network connection over which bill reduction credit data is transmitted by the rewards points system to the bill processor (step 910). The server of the rewards points system can transmit bill reduction credit data to the bill processor. In some implementations, the server can establish a connection with the bill processor. The server can establish the connection with the bill processor via one or more networks. In some implementations, the bill processor can communicate with the server via one or more APIs that enable the rewards points system to transmit bill reduction credit data to the bill processor. The bill reduction credit data can include a plurality of entries. In some implementations, the server of the rewards points system can update, for each rewards points account, a points balance based on transactions performed at participating entities by a user of the rewards points account.

The server transmits to the bill processor, via the first network connection, one or more network packets carrying the bill reduction credit data for a plurality of rewards accounts of the point rewards system (step 915). The bill reduction credit data can include a plurality of entries. Each entry can identify a subscriber account of a provider for which the bill processor generates bills and a bill reduction credit amount by which to reduce the bill to be generated by the bill processor for the respective subscriber account. In some implementations, the bill reduction credit data further includes a point rewards system account identifier corresponding to the respective subscriber account. In some implementations, the bill processor determines, for each rewards points account corresponding to a subscriber account of the provider for which the bill processor generates bills, the bill reduction credit amount based on a number of points in the rewards points account.

In some implementations, the server of the rewards points system can transmit the network packets carrying the bill reduction credit data by transmitting a file including a batch header, a file header, a detail record, a file trailer and a batch trailer. In some such implementations, each of the batch header, a file header, a file trailer and a batch trailer can include a predetermined number of bits corresponding to a plurality of fields.

The server, in response to the bill processor generating bills for a plurality of subscriber accounts of the provider based on the bill reduction credit data received from the server, receives a notification that the bill reduction credit amounts have been applied to the bills generated for the respective subscriber accounts (step 920). In some implementations, the bill processor can transmit, to the server, via one or more network connections, network packets that include data notifying that the bill reduction credit amounts have been applied to the bills generated for the respective subscriber accounts. The data can identify a rewards points account identifier and a bill reduction credit amount applied to the generated bill. In some implementations, the data can identifying a plurality of rewards points account identifiers. In some implementations, the data can identify, for each of the plurality of rewards points account identifiers, the bill reduction credit amount. In some implementations, the data can identify one or more bill identifiers, such as an invoice number. The data can also identify the subscriber account identifier to whose bill the bill reduction credit amount was applied.

The server of the rewards points system, in response to the rewards points system receiving the notification, updates the rewards accounts of members based on the respective bill reduction credit amount applied to the corresponding subscriber accounts (step 925). The server can update the rewards points database maintained by the rewards points system by reducing a number of points corresponding to a rewards points account identifier based on the bill reduction credit amount applied.

According to one aspect, a method of generating a bill for an account of a provider based on bill reduction credits, includes maintaining, by a first server of a bill processor, a plurality of billing accounts for which to generate bills, each billing account specific to a subscriber account of a provider of goods or services, the bill processor generating bills for a plurality of providers. The method includes establishing, by the first server with a second server of a rewards points system, a first network connection over which bill reduction credit data is transmitted by the second server of the rewards points system to the bill processor. The method includes receiving, by the first server from the second server, via the first network connection, one or more network packets carrying the bill reduction credit data for a plurality of rewards accounts of the point rewards system, the bill reduction credit data including a plurality of entries, each entry identifying a respective subscriber account of a plurality of subscriber accounts of the provider corresponding to the rewards account, and a bill reduction credit amount by which to reduce the bill to be generated by the bill processor for the respective subscriber account. The method includes receiving, by the first server, from a server of the provider via a second network connection, network packets carrying charge data, the first server configured to use the charge data to generate charges for each of the plurality of subscriber accounts of the provider. The method includes identifying, by the first server, for each billing account of the bill processor, a corresponding subscriber account and charge data corresponding to the subscriber account and a respective bill reduction credit amount of the rewards account corresponding to the subscriber account. The method includes generating, by the bill processor, for each subscriber account of the provider, data to electronically represent a bill that identifies charges for the subscriber account, a bill reduction credit amount corresponding to the subscriber account, and an amount payable based on a difference between the charges for the account and the bill reduction credit amount.

In some implementations, the bill reduction credit data further includes a point rewards system account identifier corresponding to the respective subscriber account. In some implementations, the charge data includes a plurality of entries, each entry identifying a respective subscriber account of the provider and information to generate charges for the respective subscriber account. In some implementations, the bill reduction credit data is based on rewards points earned based on transactions at participating entities, the rewards points system maintaining the plurality of rewards accounts for a plurality of users of the rewards points system.

In some implementations, receiving one or more network packets carrying the bill reduction credit data include receiving a file including a batch header, a file header, a detail record, a file trailer and a batch trailer. In some implementations, each of the batch header, a file header, a file trailer and a batch trailer include a predetermined number of bits corresponding to a plurality of fields.

According to another aspect, a method of generating a bill for an account of a provider based on bill reduction credits includes maintaining, by a first server of a rewards points system, a plurality of rewards points accounts corresponding to members that earn points based on transactions at participating entities. The method includes establishing, by the first server with a second server of a bill processor, a first network connection over which bill reduction credit data is transmitted by the rewards points system to the bill processor. The method includes transmitting, by the first server to the second server, via the first network connection, one or more network packets carrying the bill reduction credit data for a plurality of rewards accounts of the point rewards system, the bill reduction credit data including a plurality of entries, each entry identifying a subscriber account of a provider for which the bill processor generates bills and a bill reduction credit amount by which to reduce the bill to be generated by the bill processor for the respective subscriber account. The method includes responsive to the second server generating bills for a plurality of subscriber accounts of the provider based on the bill reduction credit data received from the first server, receiving, by the first server, a notification that the bill reduction credit amounts have been applied to the bills generated for the respective subscriber accounts. The method includes responsive to the first server receiving the notification, updating the rewards accounts of members based on the respective bill reduction credit amount applied to the corresponding subscriber accounts.

In some implementations, the bill reduction credit data further includes a point rewards system account identifier corresponding to the respective subscriber account. In some implementations, the method includes determining, for each rewards points account corresponding to a subscriber account of the provider for which the bill processor generates bills, the bill reduction credit amount based on a number of points in the rewards points account.

In some implementations, the method includes updating, for each rewards points account, a points balance based on transactions performed at participating entities by a user of the rewards points account. In some implementations, transmitting the network packets carrying the bill reduction credit data include transmitting a file including a batch header, a file header, a detail record, a file trailer and a batch trailer. In some implementations, each of the batch header, a file header, a file trailer and a batch trailer include a predetermined number of bits corresponding to a plurality of fields.

According to another aspect, a system of generating a bill for an account of a subscription-based provider based on bill reduction credits, includes a bill processor including a first server, the server including a billing account manager configured to maintain a plurality of billing accounts for which to generate bills, each billing account specific to a subscriber account of a provider of goods or services, the bill processor generating bills for a plurality of providers. The system also includes a bill reduction credit processor configured to establish, between the first server and a second server of a rewards points system, a first network connection over which bill reduction credit data is transmitted by the rewards points system to the bill processor; receive, from the second server, via the first network connection, one or more network packets carrying the bill reduction credit data for a plurality of rewards accounts of the point rewards system, the bill reduction credit data including a plurality of entries, each entry identifying a respective subscriber account of a plurality of subscriber accounts of the provider corresponding to the rewards account, and a bill reduction credit amount by which to reduce the bill to be generated by the bill processor for the respective subscriber account. The system also includes a bill generator configured to receive, from a server of the provider via a second network connection, network packets carrying charge data, the first server configured to use the charge data to generate charges for each of the plurality of subscriber accounts of the provider; identify, for each billing account of the bill processor, a corresponding subscriber account and charge data corresponding to the subscriber account and a respective bill reduction credit amount of the rewards account corresponding to the subscriber account; and generate, for each subscriber account of the provider, a bill that identifies charges for the subscriber account, a bill reduction credit amount corresponding to the subscriber account, and an amount payable based on a difference between the charges for the account and the bill reduction credit amount.

In some implementations, the bill reduction credit data further includes a point rewards system account identifier corresponding to the respective subscriber account. In some implementations, the charge data includes a plurality of entries, each entry identifying a respective subscriber account of the provider and information to generate charges for the respective subscriber account. In some implementations, the bill reduction credit data is based on rewards points earned based on transactions at participating entities, the rewards points system maintaining the plurality of rewards accounts for a plurality of users of the rewards points system. In some implementations, receiving one or more network packets carrying the bill reduction credit data include receiving a file including a batch header, a file header, a detail record, a file trailer and a batch trailer. In some implementations, each of the batch header, a file header, a file trailer and a batch trailer include a predetermined number of bits corresponding to a plurality of fields.

In some implementations, the bill generator is further configured to identify a past due amount for each subscriber account and include the past due amount in the bill generated for each subscriber account. In some implementations, the bill generator is further configured to receive payment data from the provider, the payment data including one or more subscriber accounts and a payment amount to be applied to the billing account corresponding to the subscriber account.

FIG. 10 is a flow diagram illustrating a method for establishing communication interfaces in an information technology infrastructure. The method 1000 includes storing, by a server on a database configured on the server, identifiers to each of a plurality of information reporting accounts corresponding to subscriber accounts maintained on a first remote server (block 1005). The method includes receiving, by a first interface executed on the server, via a first network, data about usage of each subscriber's account maintained by the first remote server (block 1010). The method includes storing, by the first interface, the data about usage of each subscriber's account to the database (block 1015). The method includes identifying, by the server, a second remote server to obtain data about credits to apply (block 1020). The method includes establishing, by a second interface executing on the server, a connection with the second remote server responsive to a predetermined event (block 1025). The method includes receiving, by the second interface, via a second network, for one or more of the information reporting accounts, data about rewards credited and maintained by the second remote server (block 1030). The method includes storing, for each of one or more of the information reporting accounts corresponding to the subscriber accounts, the data about the rewards corresponding to the information reporting account to the database (block 1035). The method includes receiving, by an information report processor executing on the server, a trigger to generate information reports for the subscriber accounts (block 1040). The method includes generating, by the information report processor, responsive to receiving the trigger, an electronic representation of an information report for each of the plurality of information reporting accounts, the electronic representation of the information report of an information reporting account including a total amount that is based on a difference between a first amount based on the usage of the subscriber account and a second amount based on the rewards corresponding to the information reporting account (block 1045).

In some implementations, receiving, by the information report processor executing on the server, the trigger to generate information reports for the subscriber accounts includes receiving the trigger in accordance with a report generation policy including one or more rules based on time. In some implementations, receiving, by the second interface, via the second network, for one or more of the information reporting accounts, data about rewards includes receiving one or more network packets carrying data identifying the rewards, the data including an executable file including a batch header, a file header, a detail record, a file trailer and a batch trailer. In some implementations, establishing, by the second interface executing on the server, the connection with the second remote server responsive to the predetermined event includes establishing between the server and the second remote server, a secure communication channel over which the second interface receives the data about rewards for one or more of the information reporting accounts.

In some implementations, the predetermined event includes receiving, by the server, from the first remote server, the trigger to generate information reports for the subscriber accounts. In some implementations, the method includes determining that a condition for generating information reports has been satisfied and responsive to determining that the condition for generating information reports has been satisfied, causing the second interface to establish the connection. In some implementations, the condition for generating information reports is based on a report generation policy. In some implementations, the first interface is configured to establish between the server and the first remote server, a secure communication channel over which the first interface receives the data about usage of each subscriber's account maintained by the first remote server. In some implementations, the trigger includes a set of computer-executable instructions received from the first remote server.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for providing systems and methods for molecular analysis of adverse event data, it will now become apparent to one of skill in the art that other embodiments incorporating the concepts of the invention may be used.

What is claimed is:

1. A system for establishing communication interfaces in an information technology infrastructure, comprising:
    a database configured on a server, the database storing identifiers to each of a plurality of information reporting accounts corresponding to subscriber accounts maintained on a first remote server;
    a first interface configured to receive, via a first network, data about usage of each subscriber's account maintained by the first remote server, the first interface is configured to store the data to the database and configured to establish, between the server and the first remote server, a secure communication channel over which the first interface receives the data about usage of each subscriber's account maintained by the first remote server;
    the server is configured to identify a second remote server to obtain data about credits to apply and responsive to a predetermined event, establish a connection with the second remote server via a second interface,
    the second interface is configured to receive, via a second network, for one or more of the information reporting accounts, one or more network packets carrying data about rewards credited and maintained by the second remote server, and store, for each of one or more of the information reporting accounts corresponding to the subscriber accounts, the data about the rewards corresponding to the information reporting account to the database, the data about the rewards including an executable or data file including a batch header, a file header, a detail record, a file trailer and a batch trailer;
    an information report processor configured to receive a trigger to generate information reports for the subscriber accounts in accordance with a report generation policy including one or more rules based on time and to generate, responsive to receiving the trigger, an electronic representation of an information report for each of the plurality of information reporting accounts, the electronic representation of the information report of an information reporting account including a total amount that is based on a difference between a first amount based on the usage of the subscriber account and a second amount based on the rewards corresponding to the information reporting account.

2. The system of claim 1, wherein the second interface is further configured to establish between the server and the second remote server, a secure communication channel over which the second interface receives the data about rewards for one or more of the information reporting accounts.

3. The system of claim 1, wherein the server is configured to determine that a condition for generating information reports has been satisfied and responsive to determining that the condition for generating information reports has been satisfied, the server is further configured to cause the second interface to establish the secure communication channel.

4. The system of claim 3, wherein the condition for generating information reports is based on a report generation policy.

5. The system of claim 1, wherein the trigger includes a set of computer-executable instructions received from the first remote server.

6. A method for establishing communication interfaces in an information technology infrastructure, comprising:
    storing, by a server on a database configured on the server, identifiers to each of a plurality of information reporting accounts corresponding to subscriber accounts maintained on a first remote server;
    receiving, by a first interface executed on the server, via a first network, data about usage of each subscriber's account maintained by the first remote server and establishing, between the server and the first remote server, a secure communication channel over which the first interface receives the data about usage of each subscriber's account maintained by the first remote server,
    storing, by the first interface, the data about usage of each subscriber's account to the database;
    identifying, by the server, a second remote server to obtain data about credits to apply;
    establishing, by a second interface executing on the server, a connection with the second remote server responsive to a predetermined event;
    receiving, by the second interface, via a second network, for one or more of the information reporting accounts, one or more network packets carrying data about rewards credited and maintained by the second remote server, the data about the rewards including an executable or data file including a batch header, a file header, a detail record, a file trailer and a batch trailer;
    storing, for each of one or more of the information reporting accounts corresponding to the subscriber accounts, the data about the rewards corresponding to the information reporting account to the database;
    receiving, by an information report processor executing on the server, a trigger to generate information reports for the subscriber accounts in accordance with a report generation policy including one or more rules based on time; and generating, by the information report processor, responsive to receiving the trigger, an electronic representation of an information report for each of the plurality of information reporting accounts, the electronic representation of the information report of an information reporting account including a total amount that is based on a difference between a first amount based on the usage of the subscriber account and a second amount based on the rewards corresponding to the information reporting account.

7. The method of claim 6, wherein establishing, by the second interface executing on the server, the connection with the second remote server responsive to the predetermined event includes establishing between the server and the second remote server, a secure communication channel over which the second interface receives the data about rewards for one or more of the information reporting accounts.

8. The method of claim 7, wherein the predetermined event includes receiving, by the server, from the first remote server, the trigger to generate information reports for the subscriber accounts.

9. The method of claim 6, further comprising:
determining that a condition for generating information reports has been satisfied; and
responsive to determining that the condition for generating information reports has been satisfied, causing the second interface to establish the connection.

10. The method of claim 9, wherein the condition for generating information reports is based on a report generation policy.

11. The method of claim 6, wherein the trigger includes a set of computer-executable instructions received from the first remote server.

12. A non-transitory computer-readable storage medium having computer-executable instructions stored thereon, which when executed by one or more processors of a computer, cause the computer to:
store, by a server on a database configured on the server, identifiers to each of a plurality of information reporting accounts corresponding to subscriber accounts maintained on a first remote server;
receive, by a first interface executed on the server, via a first network, data about usage of each subscriber's account maintained by the first remote server and establish between the server and the first remote server, a secure communication channel over which the first interface receives the data about usage of each subscriber's account maintained by the first remote server,
store, by the first interface, the data about usage of each subscriber's account to the database;
identify, by the server, a second remote server to obtain data about credits to apply;
establish, by a second interface executing on the server, a connection with the second remote server responsive to a predetermined event;
receive, by the second interface, via a second network, for one or more of the information reporting accounts, one or more network packets carrying data about rewards credited and maintained by the second remote server, the data about the rewards including an executable or data file including a batch header, a file header, a detail record, a file trailer and a batch trailer;
store, for each of one or more of the information reporting accounts corresponding to the subscriber accounts, the data about the rewards corresponding to the information reporting account to the database;
receive, by an information report processor executing on the server, a trigger to generate information reports for the subscriber accounts in accordance with a report generation policy including one or more rules based on time; and
generate, by the information report processor, responsive to receiving the trigger, an electronic representation of an information report for each of the plurality of information reporting accounts, the electronic representation of the information report of an information reporting account including a total amount that is based on a difference between a first amount based on the usage of the subscriber account and a second amount based on the rewards corresponding to the information reporting account.

13. The computer-readable storage medium of claim 12, wherein the predetermined event includes receiving, by the server, from the first remote server, the trigger to generate information reports for the subscriber accounts.

* * * * *